United States Patent
Hoehnen et al.

(10) Patent No.: US 11,829,952 B1
(45) Date of Patent: *Nov. 28, 2023

(54) RESOURCE MANAGEMENT SYSTEM

(71) Applicant: PROGRESSIVE CASUALTY INSURANCE COMPANY, Mayfield Village, OH (US)

(72) Inventors: Jason Hoehnen, Mayfield Village, OH (US); Allen Layne, Mayfield Village, OH (US); Erika Vigliucci, Mayfield Village, OH (US); Surendra Nimmagadda, Mayfield Village, OH (US); Christian Carter, Mayfield Village, OH (US); Kaitlin Rizk, Mayfield Village, OH (US)

(73) Assignee: Progressive Casualty Insurance Company, Mayfield Village, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,708

(22) Filed: Apr. 4, 2023

Related U.S. Application Data

(63) Continuation-in-part of application No. 17/232,339, filed on Apr. 16, 2021, now Pat. No. 11,645,623, (Continued)

(51) Int. Cl.
H04L 29/06 (2006.01)
G06Q 10/10 (2023.01)
(Continued)

(52) U.S. Cl.
CPC ........... *G06Q 10/103* (2013.01); *G06F 9/547* (2013.01); *G06F 16/242* (2019.01); *G06Q 20/085* (2013.01); *G06Q 30/0185* (2013.01); *G06Q 30/0611* (2013.01); *G06Q 30/0631* (2013.01); *H04L 9/085* (2013.01); *H04L 9/0894* (2013.01); *H04L 63/08* (2013.01); *H04L 63/102* (2013.01); *H04L 67/52* (2022.05); *G06Q 10/1093* (2013.01); *G06Q 10/20* (2013.01);
(Continued)

(58) Field of Classification Search
CPC ..... G06F 16/242; H04L 63/08; H04L 63/102; H04L 9/085; H04L 9/0894
USPC ........................................................ 726/26
See application file for complete search history.

(56) References Cited

U.S. PATENT DOCUMENTS

| | | | |
|---|---|---|---|
| 9,449,040 B2 * | 9/2016 | Gupta ..................... | G06F 16/27 |
| 2019/0171743 A1 * | 6/2019 | Ding ..................... | G06F 16/213 |

* cited by examiner

*Primary Examiner* — Longbit Chai
(74) *Attorney, Agent, or Firm* — Lempia Summerfield Katz LLC

(57) ABSTRACT

A system automatically manages data through a declarative client that retrieves data and caches data in response to a transmission of an auto-generated query from an end-user interface. The declarative client is served by a cloud services platform. A serverless engine receives images as a template in which a secure container is generated and receives multiple tasks that process the image within the secure container. An application programming interface extracts data in response to the auto-generated query. The declarative client includes a cache that breaks up results of the auto-generated queries into individual objects that are associated with a unique identifier across and a unique name to speed up the execution of the auto-generated queries. A scalable domain name system routes requests to access an instance of a cloud application and caches the name of the domain in response to the request.

30 Claims, 33 Drawing Sheets

Related U.S. Application Data which is a continuation of application No. 16/998,614, filed on Aug. 20, 2020, now Pat. No. 10,997,559.

(51) Int. Cl.
*G06F 16/242* (2019.01)
*H04L 9/40* (2022.01)
*H04L 9/08* (2006.01)
*G06Q 20/08* (2012.01)
*G06Q 30/0601* (2023.01)
*G06Q 30/018* (2023.01)
*G06F 9/54* (2006.01)
*H04L 67/52* (2022.01)
*H04W 4/12* (2009.01)
*G06Q 10/1093* (2023.01)
*G06Q 40/12* (2023.01)
*G06Q 10/20* (2023.01)

(52) U.S. Cl.
CPC ......... *G06Q 40/12* (2013.12); *G06Q 2220/00* (2013.01); *H04W 4/12* (2013.01)

RESOURCE MANAGEMENT SYSTEM

1. PRIORITY CLAIM

This application is a continuation-in-part application of U.S. Ser. No. 17/232,339, filed Apr. 16, 2021, now U.S. Pat. No. 11,645,623, which is a continuation of U.S. Ser. No. 16/998,614, which is now U.S. Pat. No. 10,997,559, which are incorporated herein by reference. This application is also related to U.S. Ser. No. 17/387,222, which is now U.S. Pat. No. 11,288,634, which is also incorporated by reference.

BACKGROUND OF THE DISCLOSURE

Technical Field

This disclosure relates to structural management, and specifically to systems and methods that manage big data.

Related Art

Resource coordination is challenging. Some processes attempt to provision materials and services but fail to assimilate them into a holistic resource. Some processes attempt to provide access to materials and some attempt to provide access to the skills needed to process them. These systems attempt to provision access via separate front-facing software.

Known processes attempt to manage access to a resource without managing the screened and vetted professionals that install them. Such systems fail to efficiently process large data associated with these resources and services. They cannot manage multiple resources and the large data associated with them. As such, it is difficult to track progress and establish measurable objectives making the monitoring processes meaningless. Adaptability and flexibility is a challenge for these systems, as many are custom-made and personalized to different end-users.

DETAILED DESCRIPTION

The disclosed resource management systems provide rich visualizations. The systems streamline processes across selections, procurement, and services using intelligent caching and proxies that simplify managing remote resources and large data. The systems generate graphically rich interactive screens that dynamically render project information over time through invisible mappings while guaranteeing financial commitments. The mappings establish associations between resource addresses for remote sources and remote destinations to local sources through intelligent caches and proxies. The invisible mappings re-direct what is usually served by remote sources via external requests to local sources. The systems create the impression that content is served independently through containers and computer framing, without the delay and bandwidth consumption that usually comes with such technology.

The systems provide alerts and status indicators while providing observations that end-users make electronically. In operation, some end-users have access to projects in their domain through desktop software and mobile apps by the system's knowledge of its users. When access is granted, end-users coordinate services, enter observations, request assessments, establish analytics, track outcomes, track quality, and/or receive guarantees.

To access objects that render content, connections are usually made between remote resources and local interfaces via remote requests and responses. Establishing network connections for each request/response for materials and services consumes network bandwidth and causes delay as many data exchanges must occur before a request can be serviced. Further, when content must be collected from multiple remote resources, some resources include deep links that contain the memory location (address) of embedded content that may be served outside of the network domain. Some linked content is served by remote resources that redirects the user to compromised external environments not served by the intended-origin server and/or network. Such link surfing may violate a same-origin server policy and/or a common domain security policy that some enterprise systems require. Subjecting users to domains outside of their demilitarized zones can cause bottlenecks that cause some origin severs to stop responding to user requests while waiting for remote responses.

Figure 1:
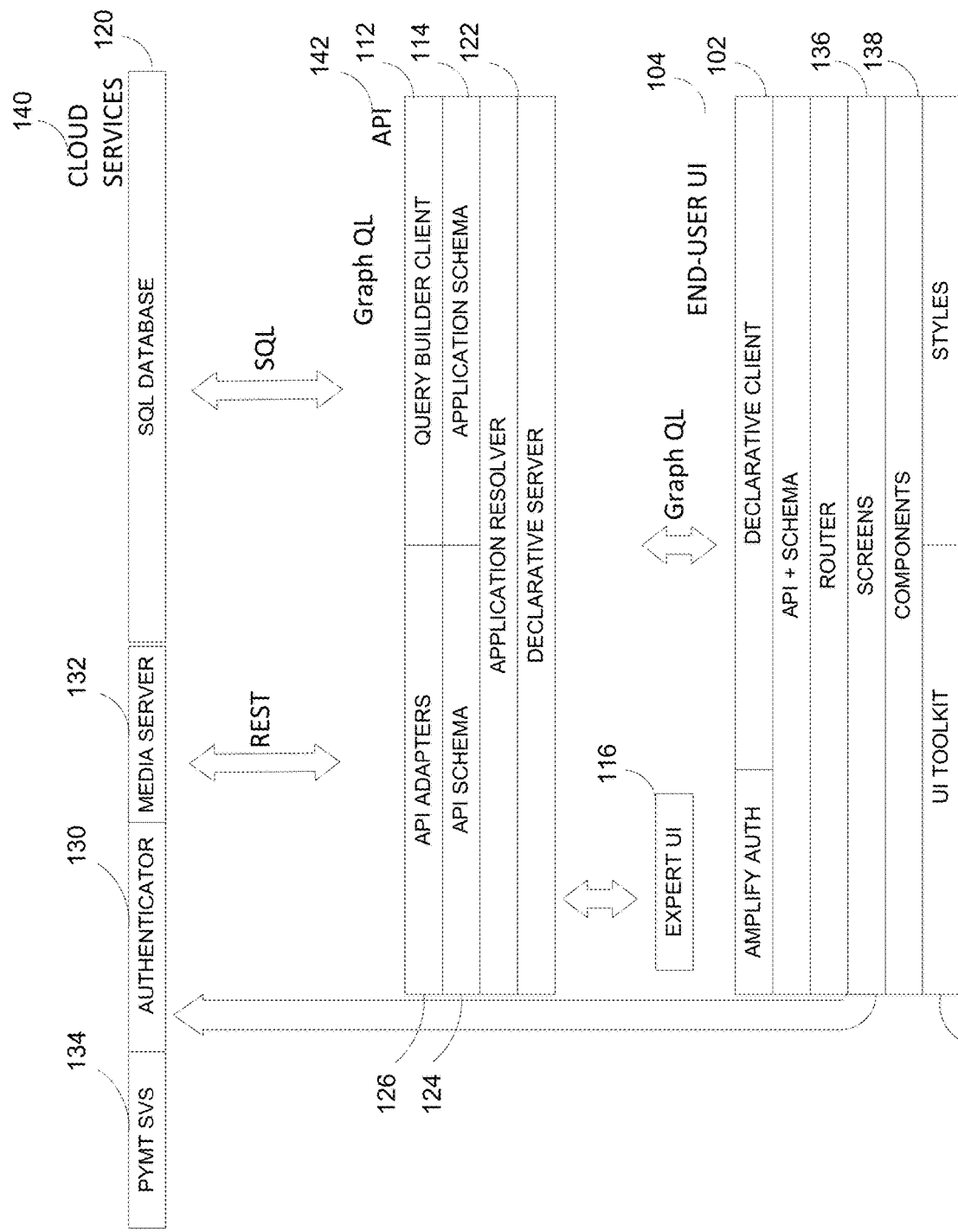
FIG. 1 is a system diagram of a resource management system architecture.

Rather than requiring end-users to access multiple remote external resources when managing desired resources, the nationwide resource management system of FIG. 1 uses a declarative client 102 for data fetching, data retrieving, load tracking, error rate tracking, caching, and/or updating end-user and expert interfaces 104 and 116. When an end-user's interface 104 request hits an application server through a secure transfer protocol such as a secure version of Hypertext Transfer Protocol (HTTPS), for example, a load balancer distributes the network traffic across multiple servers and/or server clusters. The request originates from the primary stack that requests services from the resources required to run and service an application. The resources may include a Web server, a database, and networking rules.

Using a JavaScript library that supports the end-user interfaces such as a React-based web user interface-framework, the systems serves end-user user interfaces (EUIs) through user interface UI components and guidelines directed to many components from interface layouts to language selections through a UI Toolkit 110 shown in FIG. 1. The systems provide several layout components including those based on a Flexible Box Module or flexbox that may serve as a dimensional layout module that provides accessibility, modularity, responsiveness, and theming and further reflects color selections, option type selection, and layouts. An exemplary React-based framework uses grommet in some alternate processes.

The application programming interface (API) that comprises a set of software routines used by the declarative client 102 is a graphical API. Some declarative clients 102 use an in-memory cache such as a normalized, in-memory cache, for example, to dramatically speed up the execution of queries. The cache may normalize the query results before saving them to memory by splitting results into individual objects, assigning unique identifiers to each object, and/or storing the objects in a flattened data structure associated with their unique identifiers in memory. A flattened data has no hierarchical order with no two files having the same name even in different directories. A unique identifier may combine the objects' names with a sequential operator designation and/or identifier and/or may specify the objects' path with the associated query. The in-memory cache is a device used to store data temporarily and deliver data at a rate faster than the rate the data is received. It improves system performance by reducing the number of times the declarative client 102 must go through the relatively slow process of reading from and writing to a conventional memory.

Some declarative clients 102 sit on one or more immutable images that are served by Web services, like a secure private cloud service platform 140 (also referred to as a secure cloud platform). The immutable images are different from computer snapshots as once they are made, they do not change. In other words, once images are formed, they can be deleted but cannot be modified. This ensures that once an image is created for an application, such as a home repair services app or a web home repair service app, for example, the working instances of the image won't break because of various modifications. If shared, the image functions as a new virtual home repair service application machine using the immutable image. The new machine will run like the original machine. In this architecture, images are analogous to templates, in which containers are built. Some containers run the images with a writable layer on top of the immutable image, meaning the system can modify the image only within the virtual walls of the container. In some systems, the declarative client 102 sits on Docker images that are served by a cloud service platform 140 that includes database storage 120, both of which are secure.

To avoid provisioning and managing server services, an abstraction layer in the form of a serverless compute engine process the containers that are used to access backend databases through middleware. At the core of the compute engine is a runtime API (not shown) that receives the images and tasks for the containers to process. The system creates a task definition based on the selected images, determines the CPU shares (e.g., the portion of the central processing unit allocated to the project), memory requirements, environment variable, entry point and command line arguments. Once a task is scheduled, a service API (not shown) is invoked that runs and maintains the desired number of tasks.

Once processed, an application load balancer routes the processed traffic to the desired middleware port of the middleware stack.

Using a database toolkit, an auto-generated query builder client 112 is created that resides in the middleware stack. The auto-generated query builder client 112 uses an application schema 114 that defines the application models in a data model language. The connection to a database is used to form the auto-generated query builder client 112. The schema allows the resource management experts and/or engines that access the resource management system via an expert user interface 116 to define the relationship fields without revealing the keys in the underlying database 120. In the application schema 114, a resource management expert or expert engine specifies the database connection through an environment variable and a data model that defines the application models, such as the exemplary connections shown in FIGS. 18 and 19 and FIGS. 29-33, respectively. In operation, the data models are a collection of models that represent entities of an application model. The models have two functions. The first is to represent the desired underlying relationships between the objects stored in database 120 and the second is to provide a foundation for the queries executed by the auto-generated query builder client 112. The middleware may include enterprise level security through a resolver API 122, application schemas 124, and API adapters 126. The API adapters 126 create a virtual web service on a defined port that responds to Web requests.

The auto-generated query builder client 112, like the declarative client 102, renders queries that resemble a GraphQL service in FIG. 1, making the stack exchanges more graphical from top to bottom. Once the simulated GraphQL service is running, the SQL stack in the database services 1606 (shown in FIG. 16) receives the GraphQL queries which it validates and executes. The SQL stack processes the received query to ensure it only refers to the type of fields defined in the relational database management system 120. It then runs the provided functions and renders a result.

Figure 2:
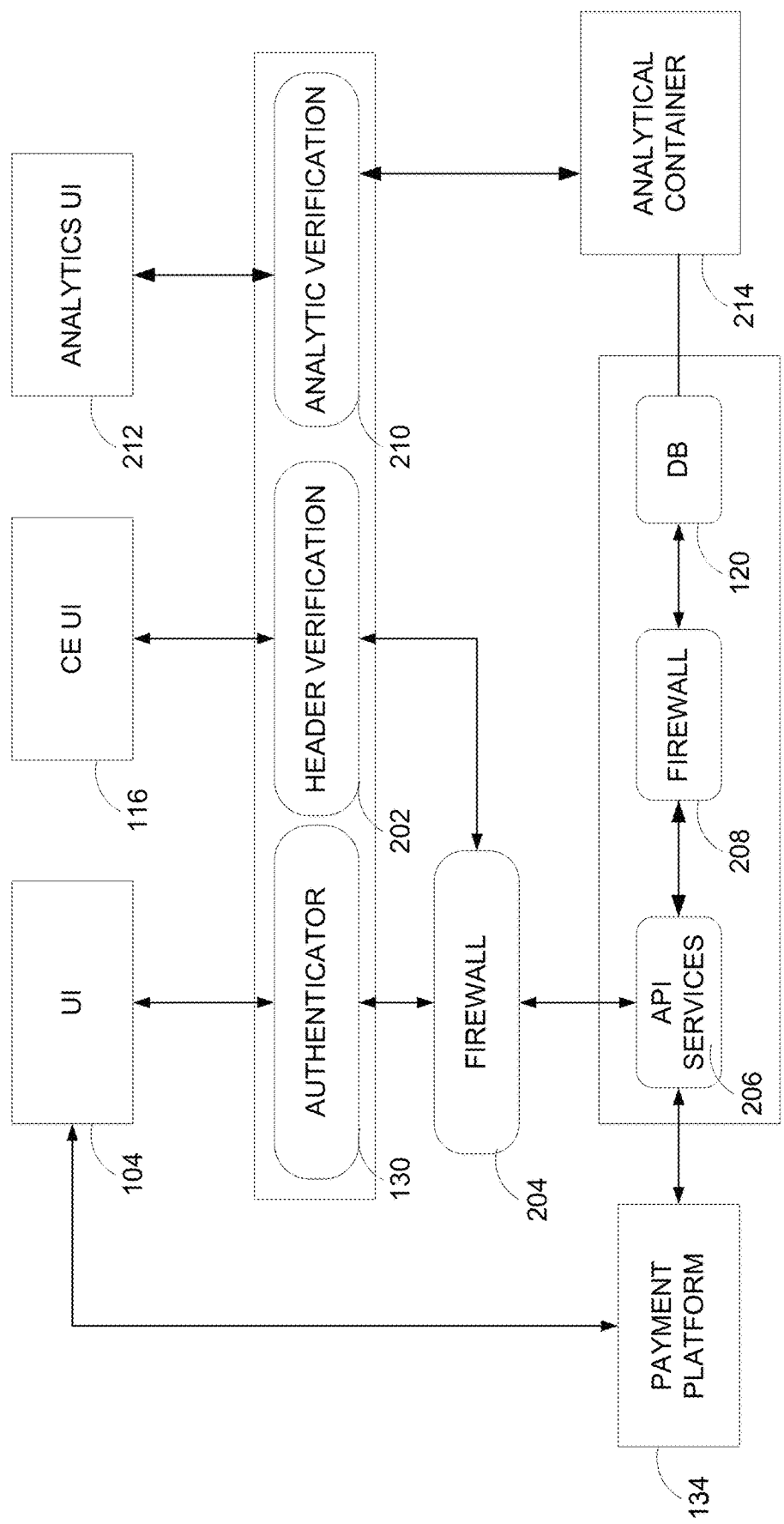
FIG. 2 is a system diagram of a resource management system authentication systems and transaction platform.
Figure 3:
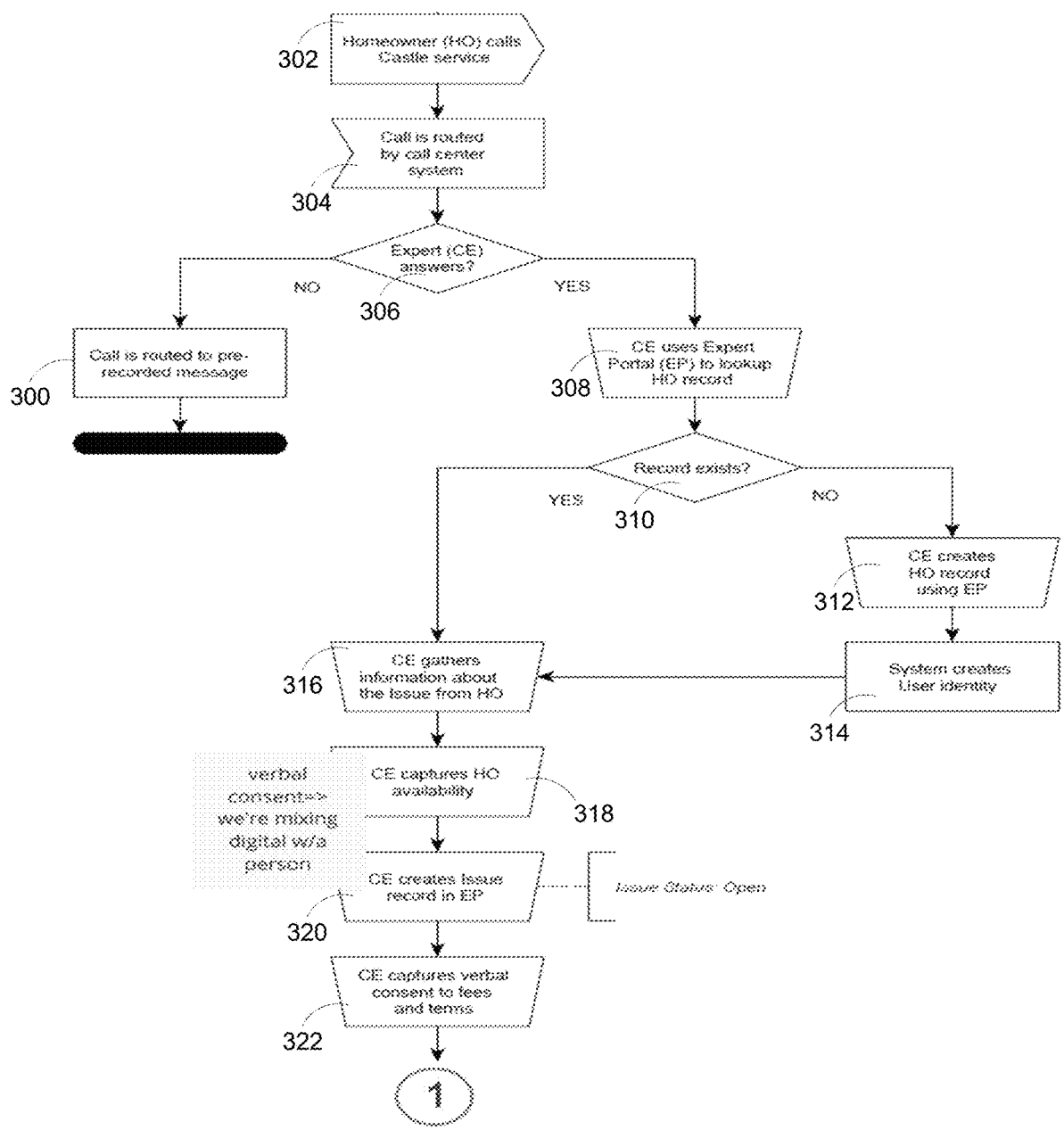
FIGS. 3-7 are process flows of an exemplary turnkey home repair process executed on a resource management system.
Figure 4:
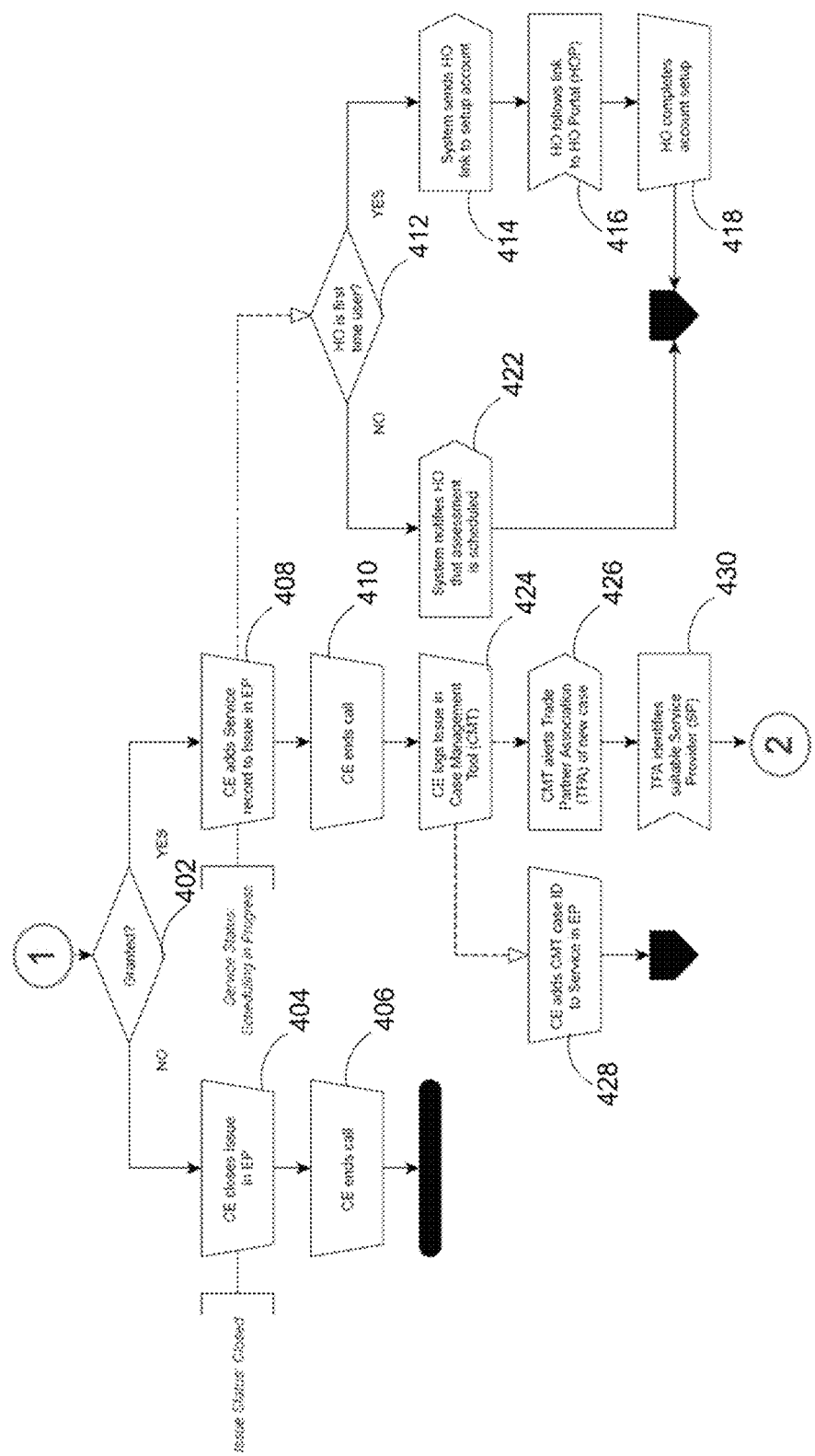
Figure 5:
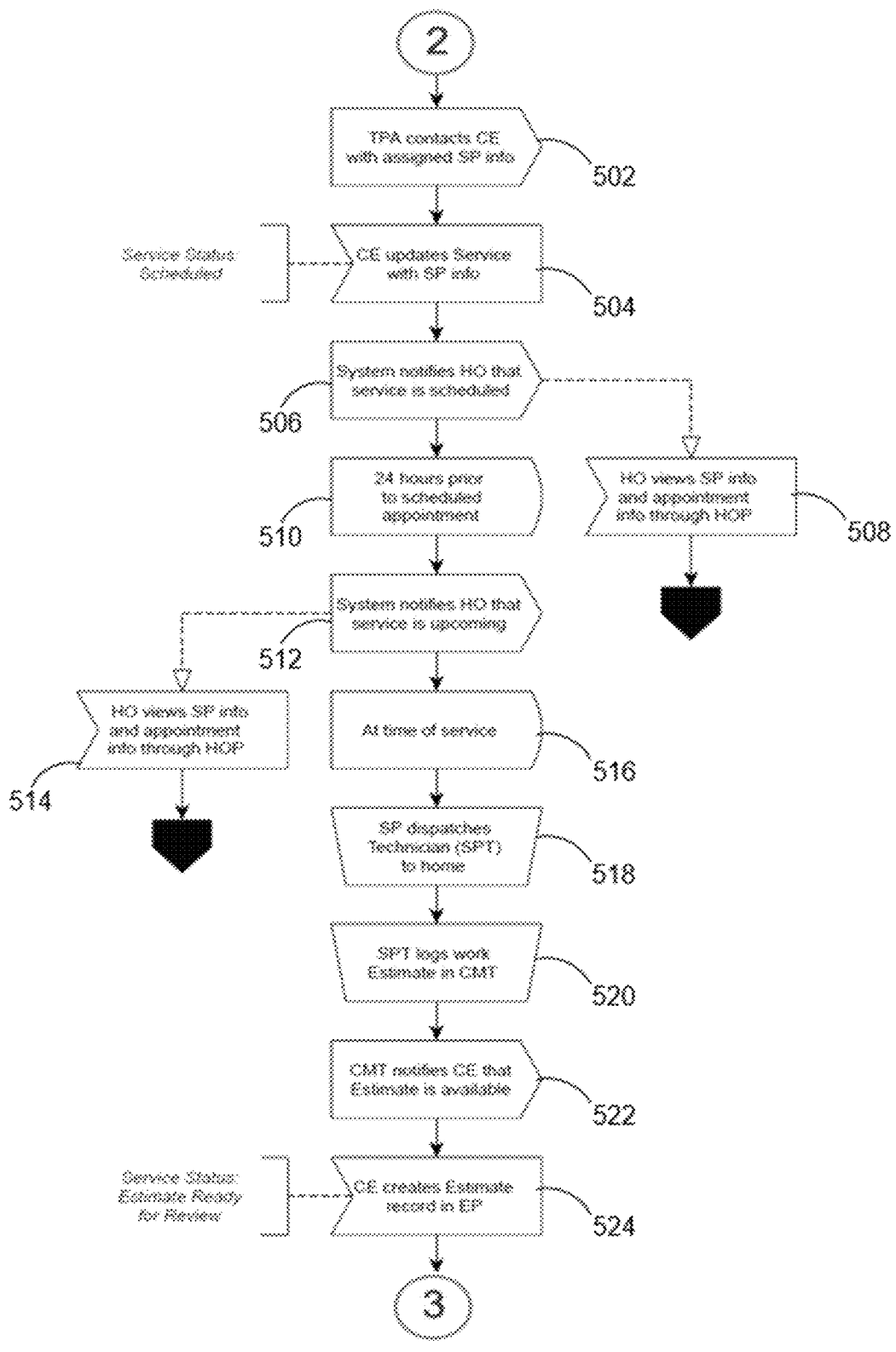

Access to the resource management system is provided through authentication and authorization servers 130, shown as an authenticator server in FIG. 2. The authentication is created for each end-user, which may include a project requester, a service expert, and/or an expert system. The systems allow end-users to access the resource management system at the security level at which they are assigned. For example, an end-user at a restricted security level, may access the resource management system through a web portal via an application only defined by the UI Toolkit 110 and a set of declarative client 102 GraphQL APIs. The GraphQL APIs are served by a database that are also constructed around GraphQLs.

The resource management system may also serve voice, video, and messaging through a software layer via a media server 132 that connects and optimizes external communications, as shown in FIG. 1. Through software developer kits (SDKs) and voice APIs, and Web and mobile clients, end-users may reach the resource management system and resource management experts/engines as they are needed. A real-time video infrastructure and video SDKs embed video collaboration and context-sharing into resource management system, with the underlying infrastructure handling signaling, registration, and media relay. Messaging APIs and messaging SDKs send and receive short message services (SMS), multimedia messages (MMS), and internet protocol (IP) messages globally from Web and mobile apps, and use intelligent delivery features to ensure messages are received by the resource management experts.

A payment platform 134 (aka full-stack payment platform) serves payment services to the resource management system, as shown in FIG. 2. The payment platform 134 replaces some of the usual models of outsourcing payments to different gateways and merchant accounts, from an exemplary single-touch payment action via an app and/or browser to mobile SDKs. In operation, an end-user interacts and authenticates with the resource management system while interacting directly with the payment platform 134. When the end-user is ready to make a payment, the resource management system directs the end-user to the payment platform 134 that runs on servers or clusters (the term "server(s)" used in this disclosure collectively refers to server clusters) that are separate and remote from the resource management system and clusters. The resource management system directs the end-user's application and/or interface, such as browser request, for example, to the required authorized payment platform 134. Thereafter, the required authorization is pushed to the payment platform 134 that process the payment and creates and pushes a payment token to the end-user UI 104, which payment is drawn against. A token comprises a nonreducible unique data structured element (e.g., the nonreducible nature maintains and ensures financial security) that describes the payment status that is usually parsed. In some systems, it comprises a textual element. The separation between the resource management system and a payment platform 134, that can stand-alone, reduces the need to migrate users to new platforms, assures interoperability with older legacy systems, and/or allows the resource management system to accept and process input intended for later system versions (e.g., forward compatibility).

When a payment token issues, it passes through authentication and authorization servers 130 (described below), a firewall 204, and API servers 142, when it is pushed by the end-user interface 104. When an end-user authorizes payment, the resource management system queries the end-user interface 104 for the payment token and additional information, such as information relating to case identifiers and descriptions about the tasks associated with them. The resource management system further transmits a request for payment with the token directly to the payment platform 134 without passing it through intermediate components. Thereafter, the payment platform 134 validates the token. If successful, the transaction is completed and the additional information is stored in a resource management system database 120 (RMS database 120). This allows the transaction to be correlated with other transactions. If a transaction fails or is later rejected, the failed payment is mediated to resolve the failure. Since payments are subject to charge backs and disputes, the payment status record in the RMS database 120 is not recorded as a permanent status. Instead, it reflects the end-user's current payment state.

When an end-user logs onto the resource management system, the user's credentials are compared to credential data maintained in the user profile in the authentication and authorization servers 130 The authentication and authorization servers 130 collect a user's profile attributes into directories called user pools that the user's mobile app or web app processes to configure their accessibility rights to the resource management resources. An identity pool consolidates end-user information, which client access platforms, devices and operating systems access from identity groups. Data synchronizes with the resource management system when an end-user's device is online, allowing an end-user to access the same information on another device without moving or entering that same information into that device. Data can also be saved in a database, such as the RMS database 120, while offline before reconnecting to the computer network. The authentication system servers associate data sets with identities and saves encrypted information in the form of cryptographic keys or value pairs that are part of an API key authorization header stored in a synchronization store (not shown) in the resource management system and validated by the header verification servers 202.

By accessing a plurality of device profiles stored in the screen layer 136 of the server cluster 108 (shown in FIG. 16), some alternate resource management systems also deliver content to most device profiles, form factors, and/or device functionalities by identifying unique combinations of characteristics and capabilities that differentiate devices from other devices through device profile comparisons and matching. By combining device data with situational information about the user, such as, for example, the user's/service provider's location (e.g., the user's/service provider's device location provided through global positioning data rendered by user's/service provider's device), IP connections, network connection speeds, and/or prior use identifiers that are stored in the user's/service provider's device profile and/or structured query language (SQL) database 120, some alternate authentication and authorization servers 120 confirm user identities by making device profile comparisons at the alternate authentication and authorization servers 120 as a second form of authentication rendering a two-way or multifactor authentication. The two-way or multifactor authentication comprises an alternate embodiment. Once a user and/or device is identified and authenticated, the data delivered is configured to the device's form factor. Some server clusters 108 tailor the data and/or functions that the resource management system provides to the identified and authenticated device's capabilities.

Once an end-user and/or device is authenticated by the authentication and authorization servers 130, a user session is initiated and the user's requests are passed through a firewall 204 before they hit the API servers 142 that provide API services 206. The API servers 142 communicate with the RMS database 120 through a second firewall 208. API servers 142 and RMS database 120 do not touch any publicly accessible networks like the Internet. Resource management experts and/or automated engine access is gained through an API key authorization header that is previously assigned in some systems that is validated by the header verification servers 202, and thus does not require validation by the authentication and authorization servers 130.

A finance and accounting interface 212 allows the resource management system to track finance and execute analytics. The accounting interface 212 interacts with the authentication and authorization servers 130 through an analytic verification 210. The resource management system provides access to system data through instance of the RMS database 120 served via an analytical container 214 that is updated at batched periodic time intervals or at a scheduled time intervals.

The resource management system has many uses, including serving web home repair service apps that provide access to resources through landlines, mobile devices and/or Web Real-Time Communication (WebRTC) clients. In the exemplary use case shown in FIGS. 3-7, an end-user, such as a homeowner, calls into a call center or network portal at 302 and 304. The call is routed to a resource management expert and/or fully automated expert engine (expert engine), which in this exemplary home repair service app process are referred to as a Castle Expert (CE). Through another network portal, the CE accesses the home-owner's records at 306 and 308. If the CE is unavailable, the communication triggers a response at 300 and if homeowner's records cannot be found at 310, the CE collects the homeowner's profile attributes through an expert portal (EP) at 312. The attributes are processed to create the end-user's identity and the homeowner's user pool at 314. At 316 and 318, the CE harvests information about the issue to be addressed. The resource management system also captures the homeowner's availability via availability windows capturing calendar dates and time periods in which the homeowner is available, and when the issue is accessible, and creates a record through the EP that is retained in a memory at 320. At 322 and 402, the resource management system solicits the homeowner's verbal acceptance of an onsite assessment and its corresponding inspection and assessment fee. If the homeowner declines, the CE closes the issue via the EP and terminates the call at 404 and 406. If the offer is accepted, the resource management system generates a service record and thereafter terminates the call at 408 and 410.

If the homeowner is a first-time user, the system transmits an address and a protocol to be used to access the system via a user-actuated link at 412-416. The protocol includes a set of rules that enable the homeowner to connect to the resource management system and exchange information automatically. Once connected, the end-user (the homeowner) completes the account set up at 418. If the end-user is not a first-time user, homeowner recognition triggers the notification that an assessment is scheduled at 422.

With the details of the issue logged into a service record via case management tools (CMT), the CE adds a CMT case identifier to the expert portal and transmits an alert to a trade partner association engine of the new case at 424-428. The trade partner engine identifies and assigns one or more suitable screened and vetted service professionals (SP) and transmits SP data to the CE EP portal, at which the system transmits a notification of the scheduled service to the homeowner at 430, and 502-506 in FIGS. 4 and 5. The notification may comprise a SMS, a text message, and/or an email with a computer link that identifies the scheduled service, that when activated at 508, prompts the homeowner to enter a password, which advances the web home repair services app to a summary page. At a predetermined time before the scheduled service is to be performed, the resource management system transmits a reminder to the web home repair services app at 510-514. Like the notification, the reminder may comprise a SMS text message, and/or an email with a computer link that identifies the scheduled service that when activated, advances the web home repair services app to a summary page. In some systems, the reminder is automatically generated from the repair service app too, and provides the homeowner with an asynchronous notification without web access. At the time of service, the SP dispatches a service provider technician (SPT) to the home at 516 and 518 to render an estimate (or quote both terms are used interchangeably).

Some systems use a secure two-way portal to communicate with SP and SPTs. This portal allows CE to send and receive secure messages, documents, and/or estimates. When an assignment event occurs via the portal, the system enter time/date stamps, which thereafter occurs automatically at each milestone event. The assignment event is routed to an SP and thereafter an SPT. Some portals designate SP and SPT availability unique geographic identifiers. The system is capable of tracing SP and SPT availability. When an assignment event occurs, the system serializes the input with a time/date stamp. When the SP accepts the assignment, the system records a second time/date stamp to record the event. When an SP rejects an assignment event and/or a predetermined amount of time passes, the system automatically withdraws the SP delegation and transmits it to another SP. Assignment events include a statement that specifies the transmission protocol and an identifying number associated with the assignment and a preformatted estimate template. Some estimate templates include guardrails based on system practices that are customized to a desired application. Some assignment events include content, such as a recommended price list based on a geographic area, that are modified periodically. When the assignment is delegated, the inspection date, start/finish dates, and estimates are upload timestamped. The SPT enters an estimate through the CMT, which causes the resource management system to transmit a notification to the CE and results in an estimate record in the EP at 516-524.

Figure 6:
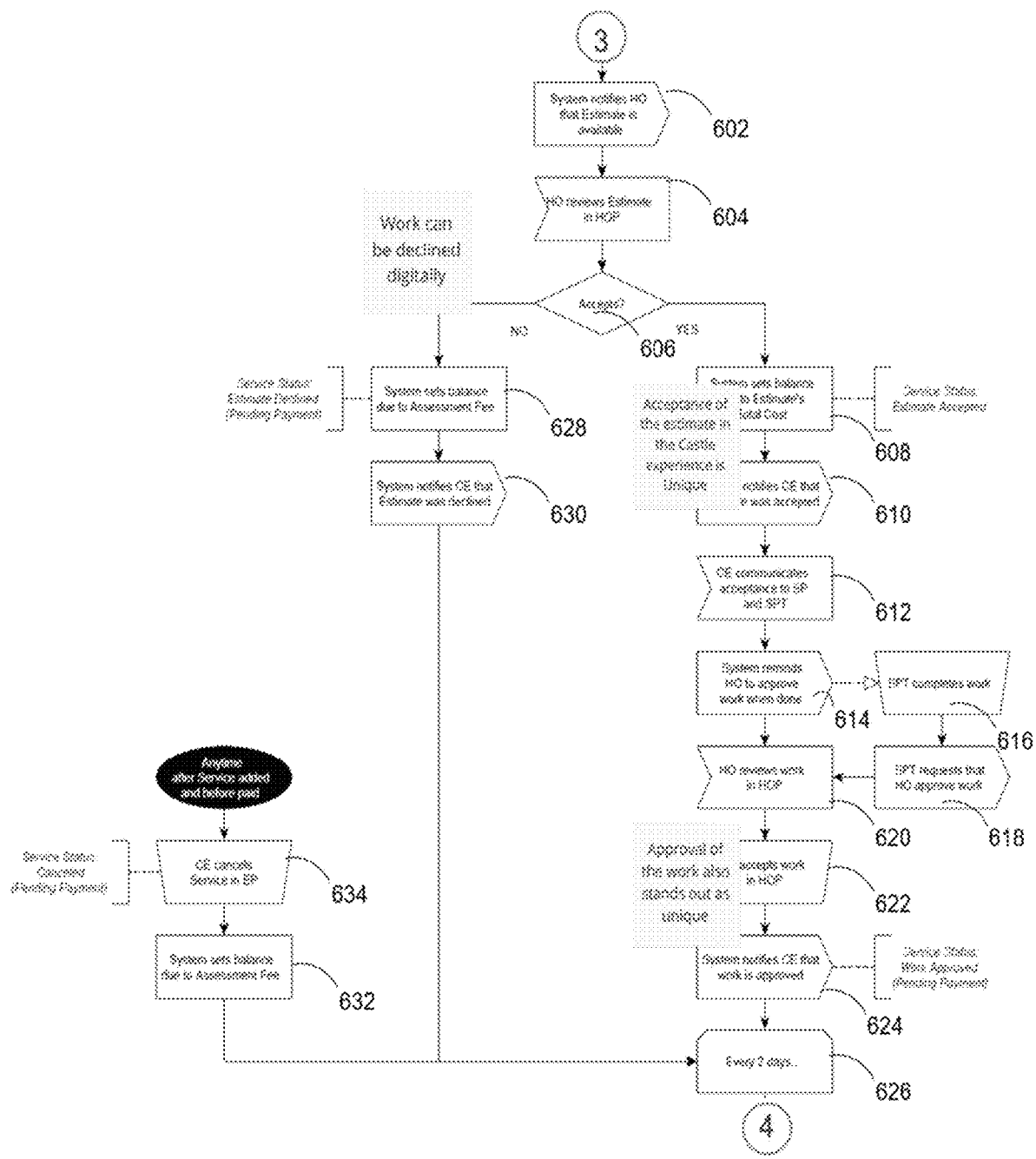

In response to the creation of the estimate record, the resource management system transmits a notification and a secure document to the homeowner that facilitates a review and an electronic acceptance of the estimate at 602-606 in FIG. 6. The resource management system eliminates the need for the end-user (here, the homeowner) to print, sign, and return physical documents using known document acceptance practices. Instead, some resource management systems grant access to the secure document via a shared cryptographic secret that grants access to the document, and electronically signing by clicking (e.g., actuating) on a secure e-signature button. A shared secret comprises cryptographic data, known only to the parties involved, in a secure communication. In some alternate resource management systems, the clicking on the secure e-signature button redirects the end-user (e.g., the homeowner) to a secure website through a combination of hypertext transfer protocol (HTTP) and a secure socket layer (SSL)/transport layer security (TLS) that confirms the end-user's signature and automatically triggers an email and/or text message to the end-user and CE portal. As a result, the most recent version of the executed agreement is stored in the RMS database 120 for future retrieval.

Acceptance (e.g., acceptance via electronic means) of the estimate triggers the resource management system to calculate the balance due, notify the CE of the acceptance, and trigger one or more automatic communications (e.g., an SMS, an email, etc.) of the acceptance to the designates SP and SPT and a communication to the homeowner to approve the work when it is completed, which triggers a CE notification at 608-624. Rejection of the offer triggers the resource management system to set an assessment fee, transmit a notification of the rejection to the CE, cancel the estimated services, and calculate open balances at 628-634.

Figure 7:
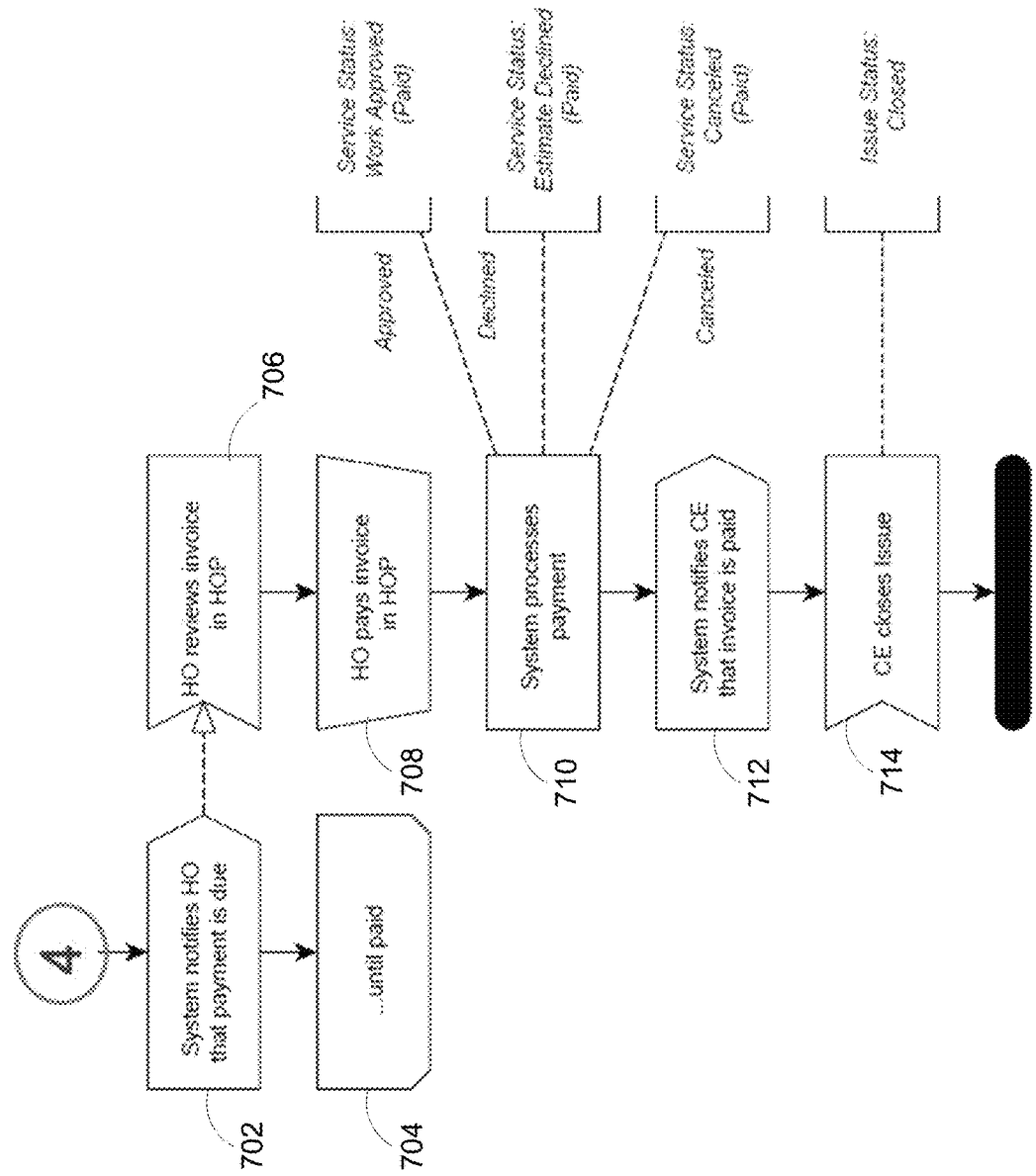
Figure 8:
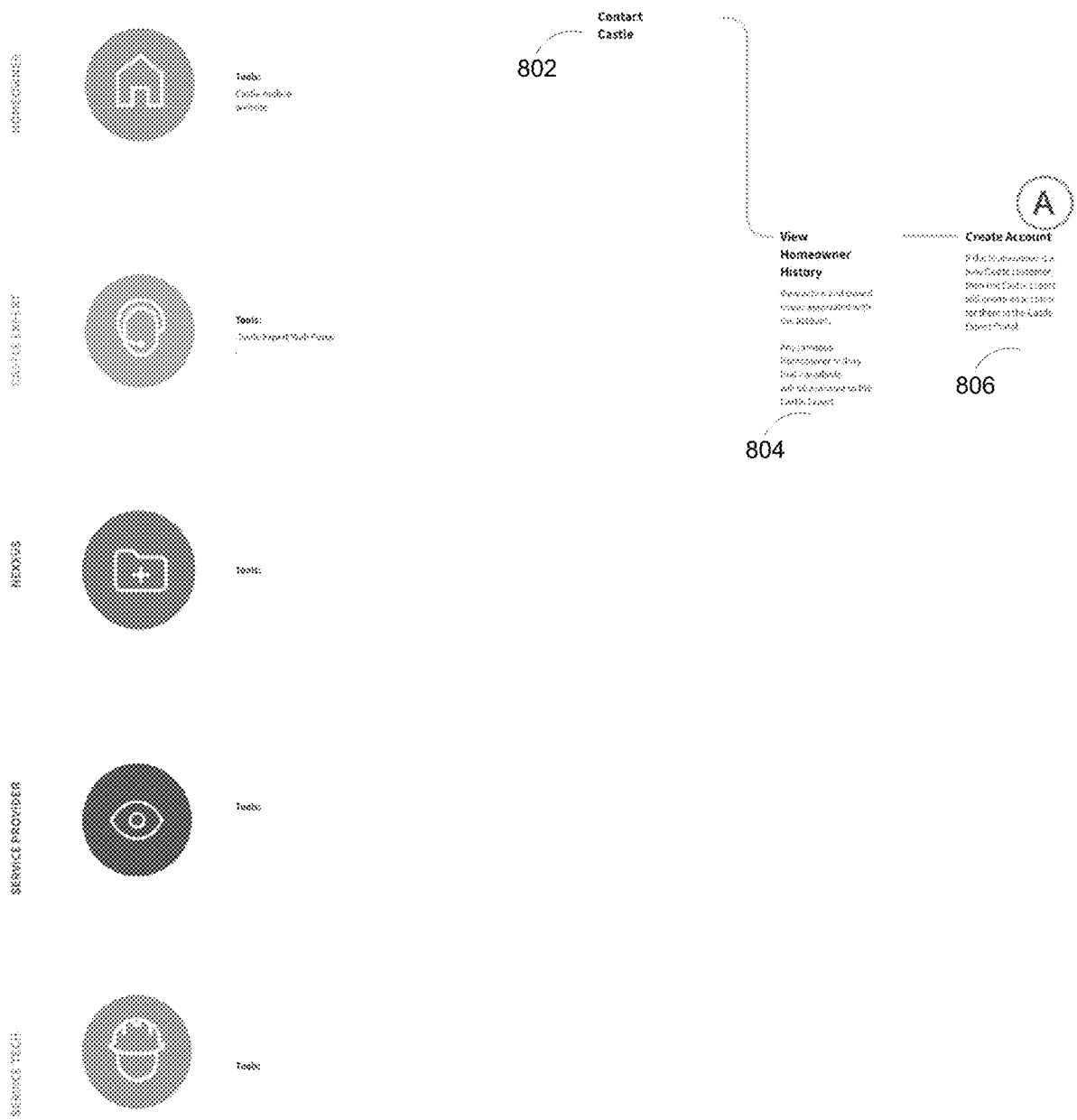
FIGS. 8-15 are alternate process flows of an exemplary turnkey home repair process executed on a resource management system.
Figure 9:
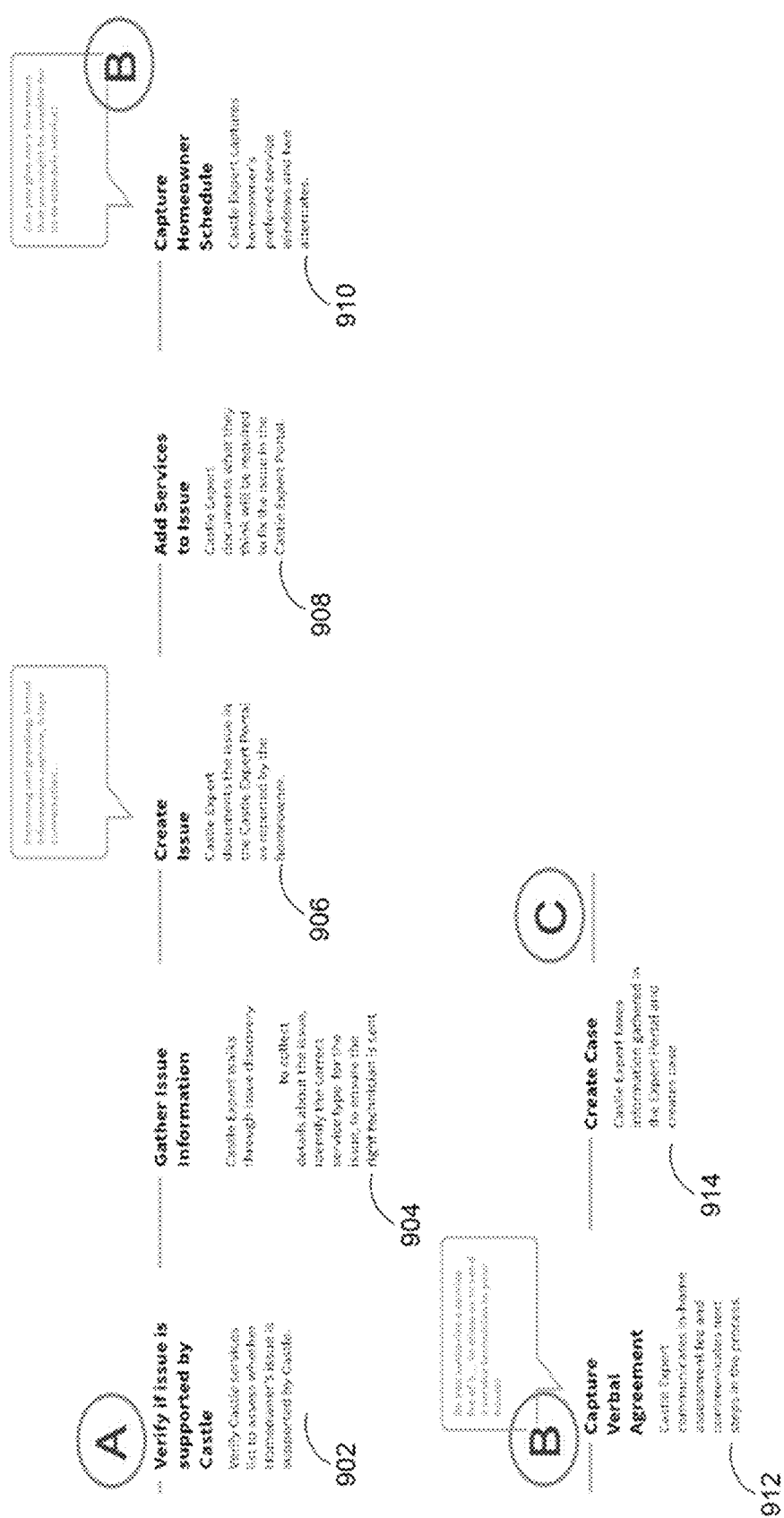

With the work completed by the SPT and approved by the homeowner, or when the offer is rejected by homeowner, the resource management system notifies the homeowner that the payment is due, which is then repeated until the invoice is paid at 626, 702-706, as shown in FIGS. 6 and 7. Payment triggers the resource management system to process the payment and notify the CE to close out the case at 708-714. Unlike known services, the system provides a concierge service. Instead of requiring users to spend time searching for qualified and responsible service repair technicians, the disclosed turnkey home repair process application leverages the in-depth knowledge of the CE (e.g., automated expert engine in some systems) that guides the homeowner in home repairs using a simple and easy to understand language. The home repair service app provides referrals to and commitments from screened and vetted professionals. The disclosed schema is unique and efficiently represents end-users, cases, SPs, and proven solutions to home maintenance issues. Some alternate turnkey systems are fully automated with the initial estimates, post-audit analysis, and all responses occurring entirely without human intervention (e.g., automatically) through chatbot engines, such as those disclosed in Chatbot Artificial Intelligence assigned U.S. Ser. No. 16/374,495, which is herein incorporated by reference in its entirety. Some fully automated turnkey systems process user-provided photographs, which may also include logic that derives output from a knowledge base through artificial intelligence.

Some web home repair services apps are rendered through mobile devices, such as the exemplary home repair mobile app referred to as Castle, in the processes shown in FIGS. 8-15 and mapped in FIGS. 23-28. The processes begin when the end-user (the homeowner) contacts Castle's backend through landlines, an email, a SMS, a chat window, etc. at 802. If the home repair mobile app system does not have a homeowner history, the system creates an account and harvests dwelling and homeowner information through the EP at 806. Otherwise, access to historical records is provided at 804. At 902, the system verifies that the issue needing repair is supported by the resource management system (Castle) in FIG. 9. The system captures the issue in the EP and captures the homeowners schedule and three preferred service windows at 904-910. The system gathers the information and generates a case in a project control center of the RMS database 120 at 914 following the capture of the user's verbal consent at 912. The project control center is where the resource management systems manages projects.

Figure 10:
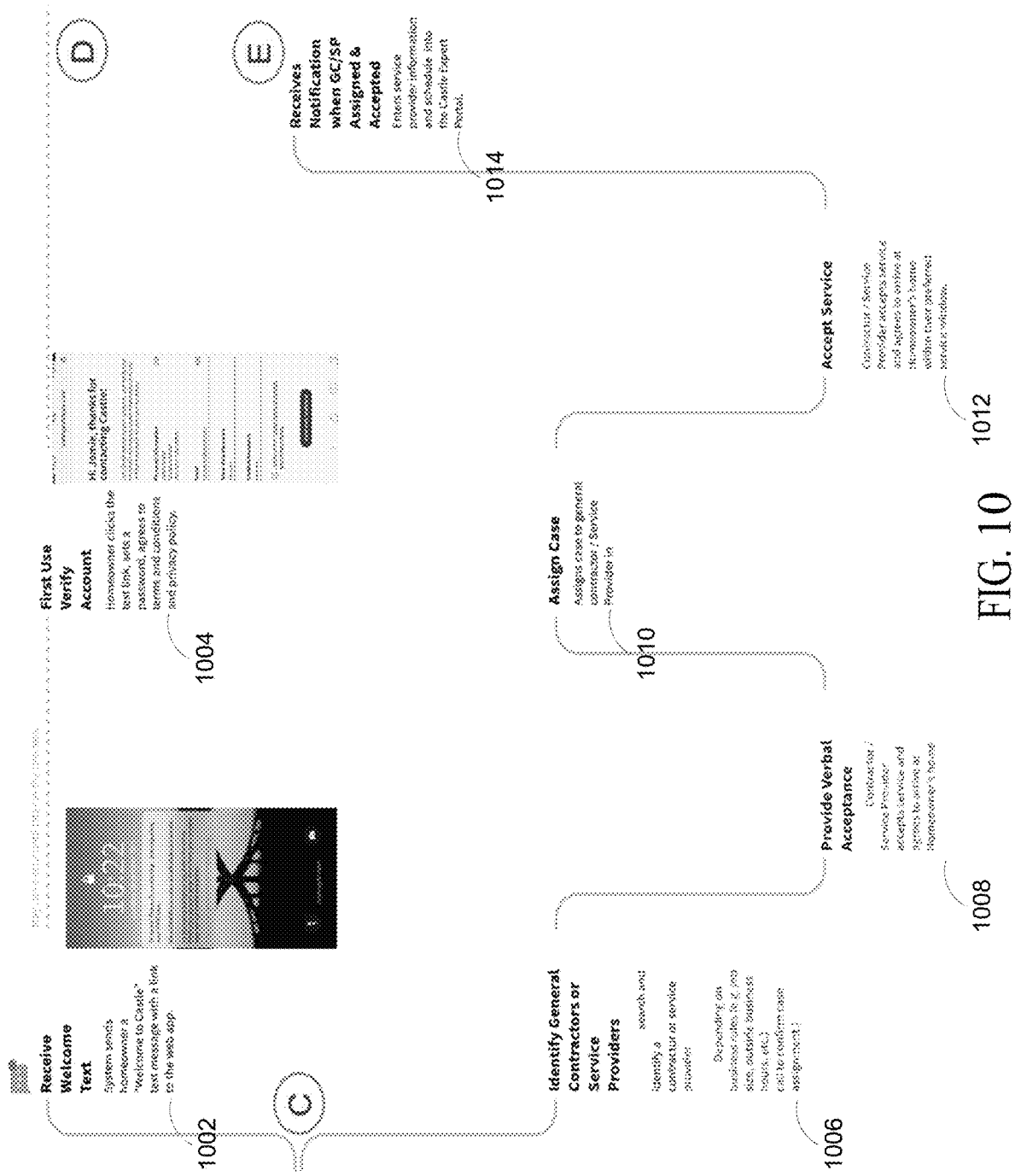
Figure 11:
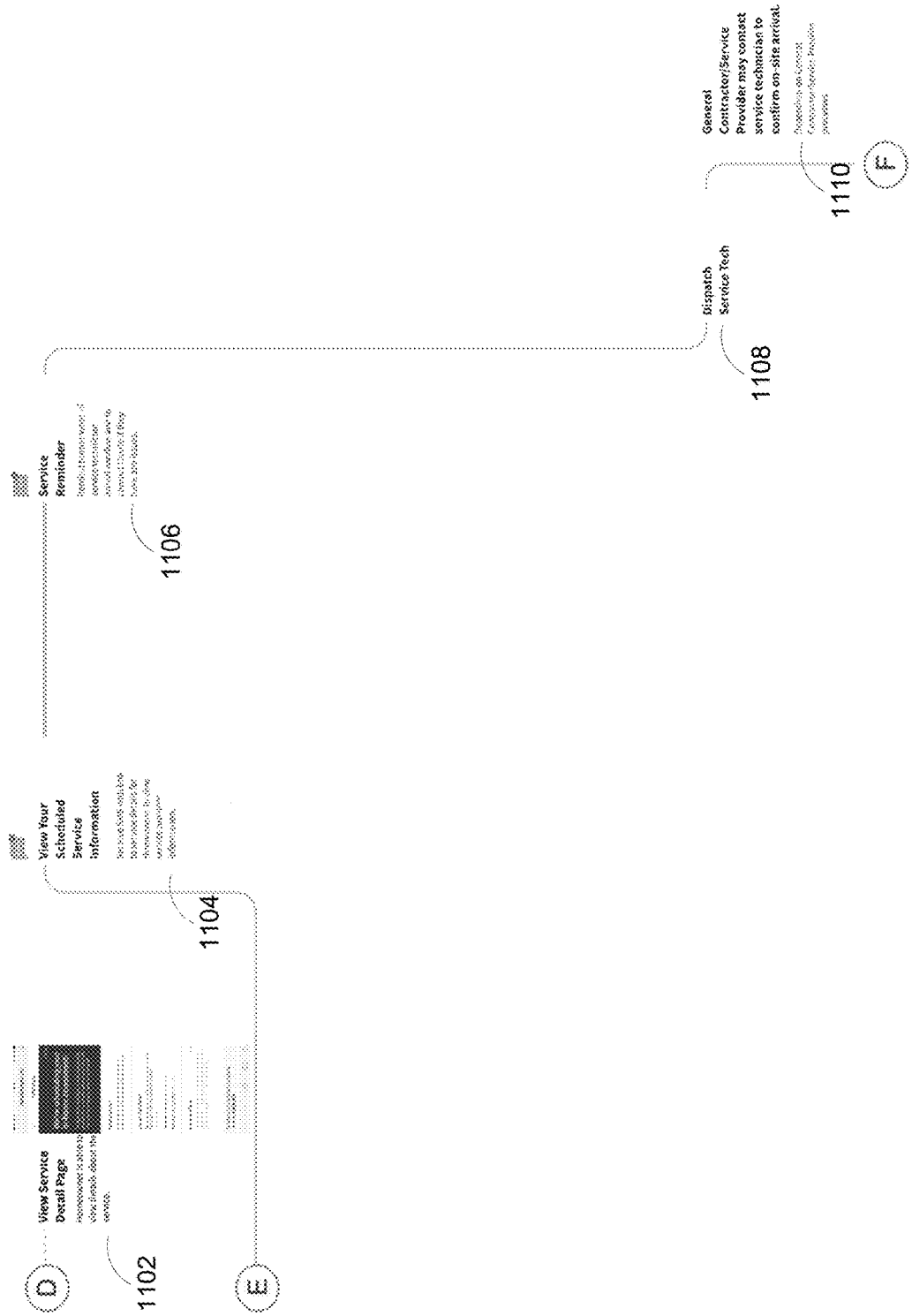

Homeowner registration triggers a welcome text and a user actuated link that includes an address and specifies a communication protocol that is used to access the system at 1002 in FIG. 10. Once connected, the end-user (the homeowner) completes the account set up at 1004 and 1102. If the end-user is not a first-time user and recognized by the system, the system will execute an automated search and identify a screened and vetted service professional. Some identifications are based on location, service type, and/or an ability to meet the homeowner's schedule. Once assigned at 1010, acceptance is made verbally and recorded at 1012, and in some alternate systems is confirmed by an SMS or an email message to the contractor and the SP in response to a speech-to-text engine's conversion of the verbal acceptance at 1006 and 1008. At 1010 the system assigns the case to the service professional. Some assignments are made based on a statistical weighting of geographic location, service types, availability to meet the homeowner's schedule, and/or customer ratings based on an averaged rating factor. Once accepted, acceptance is written to the Castle EP at 1014 and an SMS message is transmitted to the homeowner's device containing the details of the agreement at 1104 in FIG. 11. If service is scheduled a predetermined amount of time in advance, a reminder is automatically sent to and/or automatically generated by the homeowner's device at predetermined intervals at 1106, the service technician is dispatched at 1108, and arrivals at the designated location are confirmed at 1110.

Figure 12:
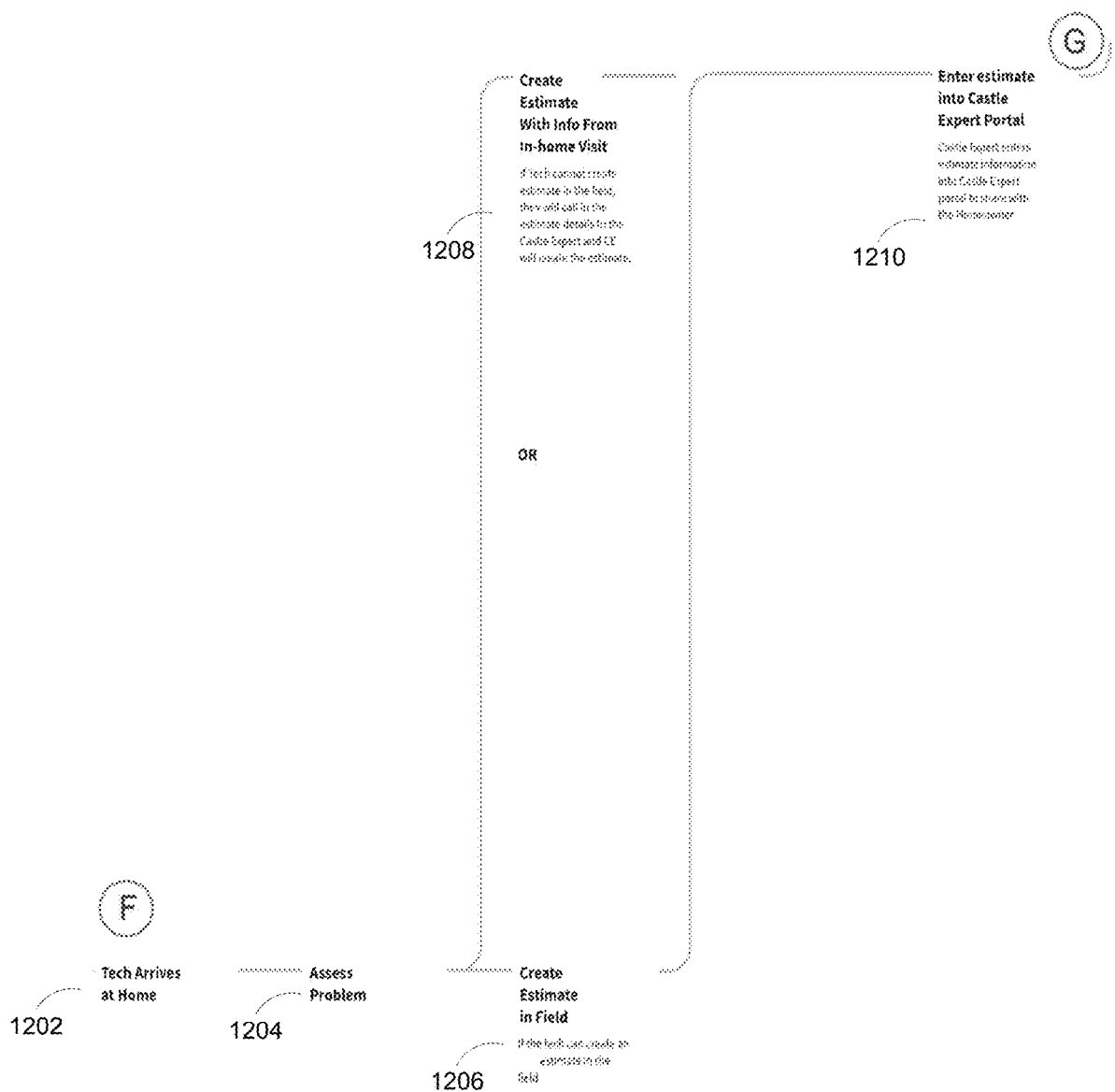
Figure 13:
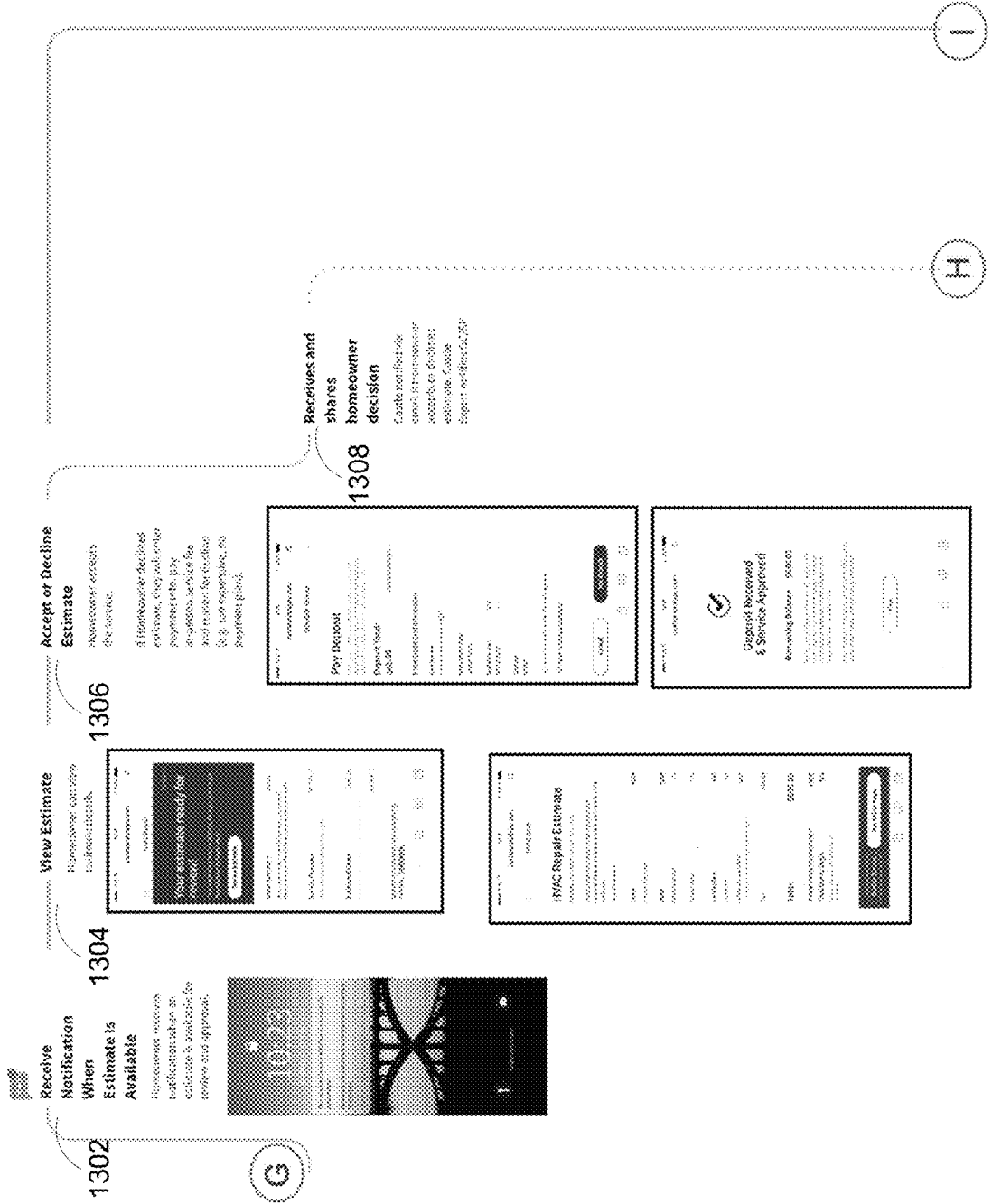
Figure 14:
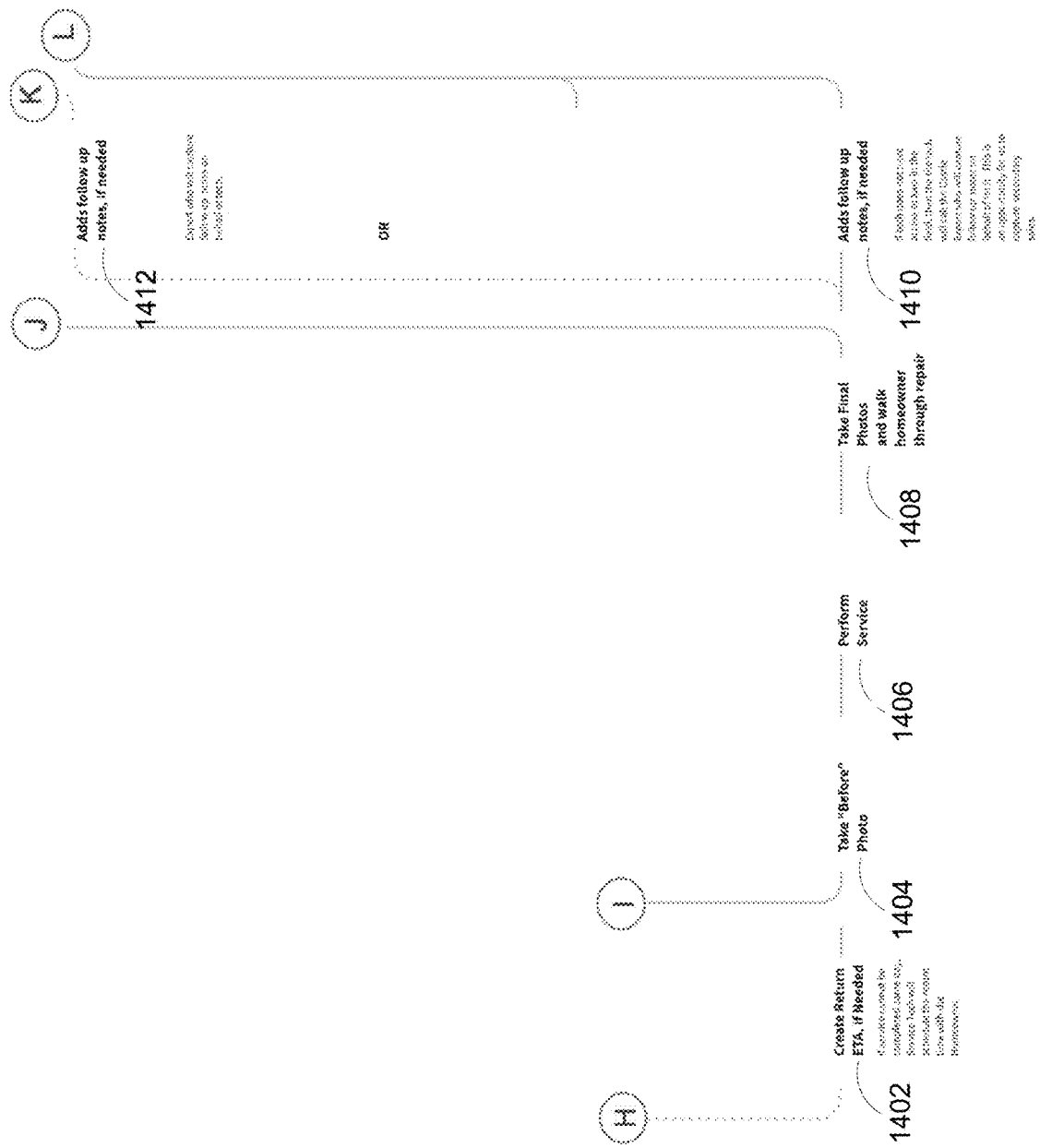
Figure 15:
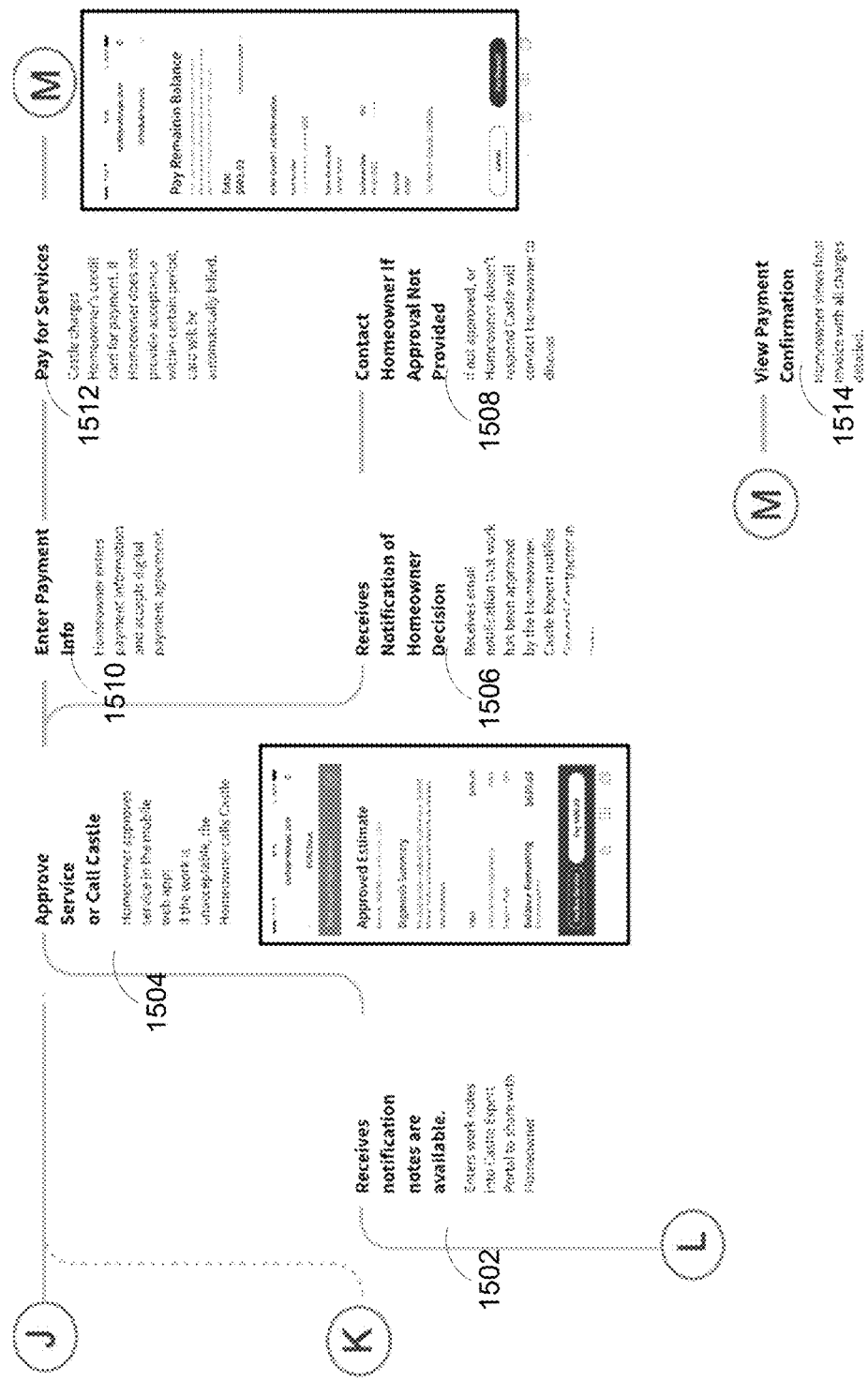

The SP technician arrives at the location and assesses the issue and generates an estimate in the field or transmits the details to the CE that automatically generates the estimate that is entered in the CE portal at 1202-1210 in FIG. 12. At 1302-1308 the homeowner's device receives and the homeowner reviews the estimate and either accepts or declines the estimate via their device (e.g., electronically), which is shared with the service provider in FIG. 13. Notification notes are shared with the homeowner at 1402 in FIG. 14. If the estimate is accepted, approval is made through the mobile app. Before the work is commenced, pictures are taken and uploaded to the system. Once work begins, it continues until the project is completed, and if further work is need, additional time is further scheduled until the project is completed at 1402-1406. Once the project is completed, the completed repairs are explained to the homeowner, final pictures of the completed project are taken, and notes are added that are uploaded to the resource management system that can be shared with the homeowner via their device at 1408-1412 and 1502 as shown in FIGS. 14 and 15. In some systems, project completion triggers a status notification to the homeowner that the contracted service(s) are completed at 1504. The completion time is transmitted to the CE through the CMT. If work is approved by the homeowner via their device, the homeowner enters the payment information and the service is charged and confirmed at 1506, 1510-1514. If not approved, the issue is mediated at 1508.

To access sites that render recommendations in the systems described above, connections are made that normally require connections to be formed between remote external resources and local interfaces. For each data object requested, interfaces send requests and in return receive responses from remote external resources, especially when SP and SPT's are identified. When content includes pictures, in addition to downloading textual resources, known interfaces download many images—some of them large. Establishing network connections for each request/response can waste network bandwidth and cause delays, as many network packets must be exchanged even before a request is processed.

Rather than requiring the remote management system to access multiple remote external resources on demand when recommendations are needed, some alternate remote management systems render and provide service professional and/or resource referrals from multiple remote resources through an alternate component layer 138 in real-time, near real-time, or after a delay. The term real-time refers to computer systems that update and process information at the same rate as they receive data, enabling them to direct or control a process, much like an automatic pilot. The alternate component layer 138 downloads data and content and intercepts links to and between the remote data elements, such as words, symbols, and images and other documents, and transparently maps those links to redirected links associated with nearly identical data in the centralized RMS database 120 (which in some instances, holds data extracted from deconstructed downloaded content). The redirected links are generated by the component layer 104. The redirected links provide or comprise new addresses to the element originally linked to remote objects and the protocol that may be used to access them centrally in the RMS database 120. The new addresses for the resources specify the new source and/or destination that reside locally in a backend cache and/or backend proxy, which may be stored and served by the local RMS database 120 that resides in a cloud storage; or in alternate systems, stored in a local document management platform. By redirecting the link and/or generating new links, the resource management system can provide recommendations, relay SPT assignments, and deliver harvested content from its own local cache, local server proxy, and/or turnkey software applications. The systems are not subject to the delays and latencies that come with requests to remote sources served by outside networks. These processes, in turn, reduce the load on the external remote resources and network bandwidth consumption. By serving content locally and centrally, content rendering speeds up dramatically.

Some resource management systems include additional features that add functionality to the resource management system as shown by logical relationship shown in FIGS. 23, 24, and 25-28. Further, some service portal functionality also includes providing: additional multifactor user authentication to sign in and sign out, service provider account creation, vendor evaluations, service view lists with appointment details, functions that upload multiple estimates, replace estimate's, and view estimates, provide notifications on one or more project states and changes such as changes in appointments, functions that add, update, and/or remove service provider employees, functions that add, update, and/or view documents, functions that update service offerings, functions that add, update, and/or view the history on projects, functions that view change orders, functions that onboard customers and establish project workflows, functions that generate and/or review workflows, functions that view job history, the integration of payment providers, functions that accept or decline rescheduled appointments and provide notifications (e.g., alerts) photo uploads and management, payment invoice visibility, and/or daily reports for project and task management.

Functionality added to the expert and/or operations portal include functionality that shows scheduling by service provider and homeowners, filters by job status, adds, updates and/or removes employees, renders estimate reports relating to jobs awaiting estimates, functionality that renders dashboards that show service provider employees with permission lists, renders dashboards that show service provider credential documents, adds functions that filter by service provider offering, provides in page filtering, adds functionality that adds and updates notes and renders reports on completed jobs, adds functionality that filters service providers by service offering, adds functionality that generates and sends change order requests, generates service provider onboarding flows, renders reports on service provider availability and customer relationship management (CRM) functionality. Customer relationship functionality may include providing service provider lead management, account management tools for notes (e.g., brief records of something written down) and follow-ups, and status indicators for background checks, licensing status, and insurance docs. Some customer relationship functionality further renders individualized customer relationship management dashboards that are personalized to the experts logged into the portal.

Functionality added to the homeowners portal include functionality that allows homeowners to view jobs by project, generate reports on job details, approve or decline estimates, view scheduled appointments, and/or view change orders.

Figure 16:
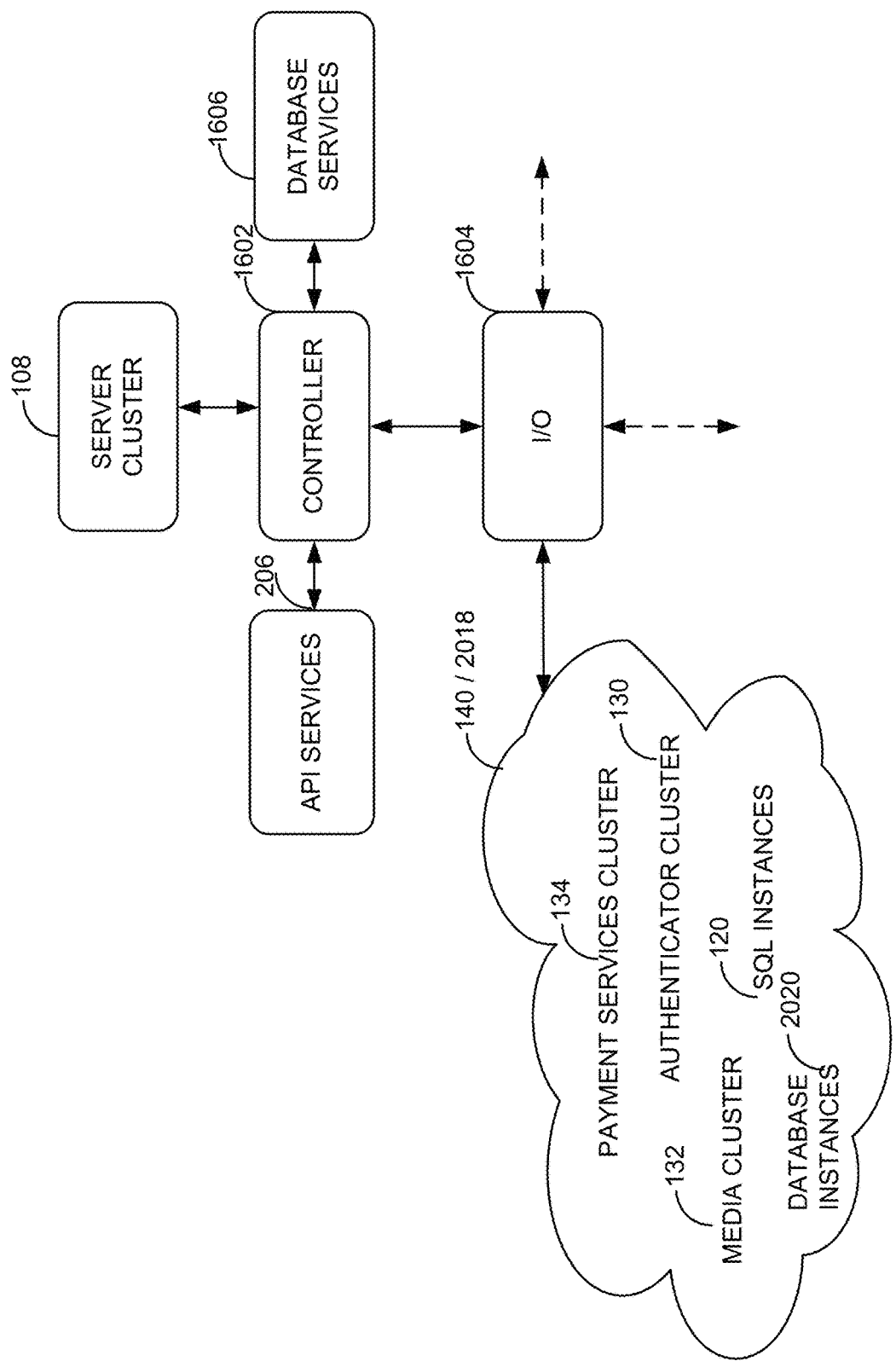
FIG. 16 is an alternate system diagram of a resource management system.
Figure 17:
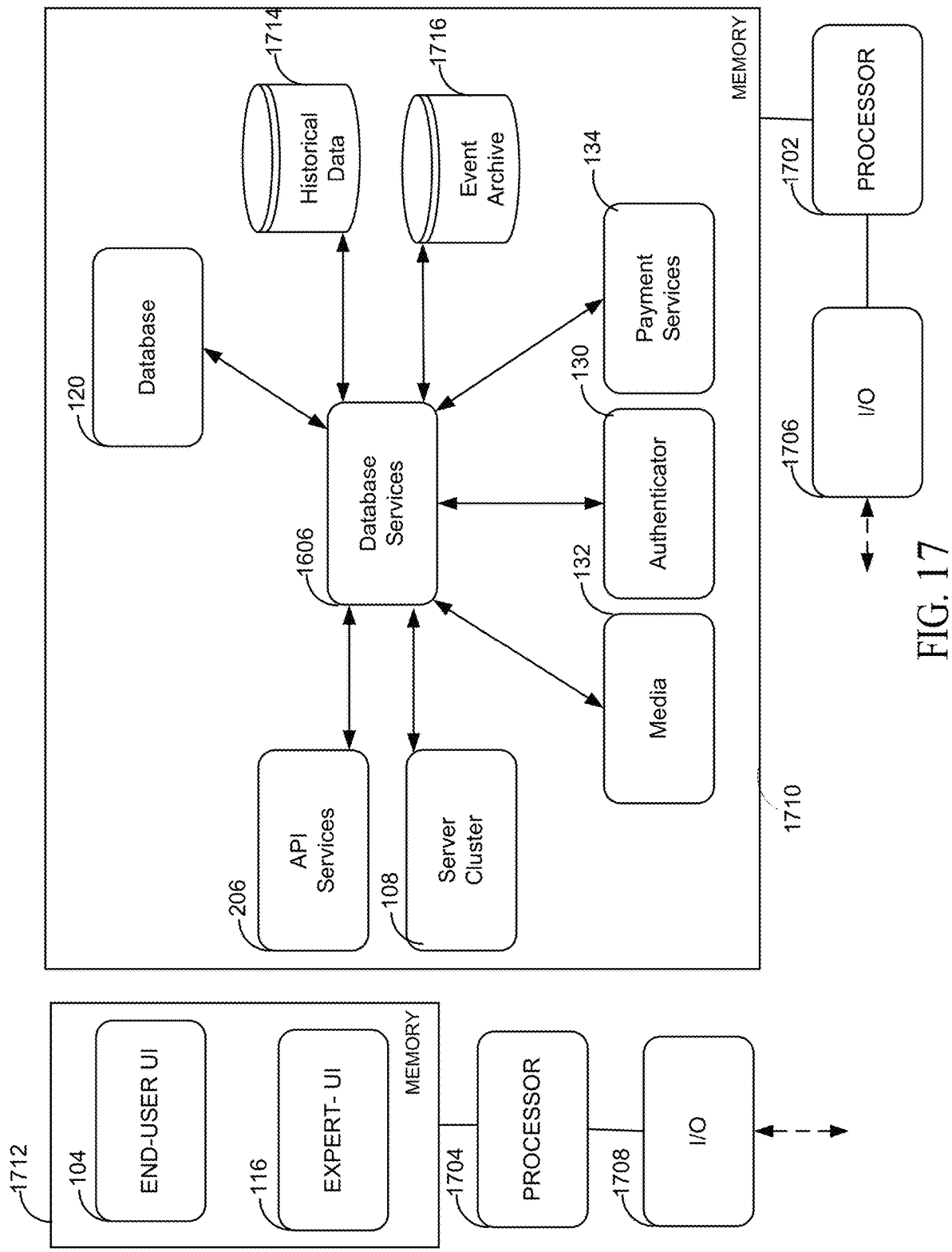
FIG. 17 is a second alternate system diagram of a resource management system.
Figure 18:
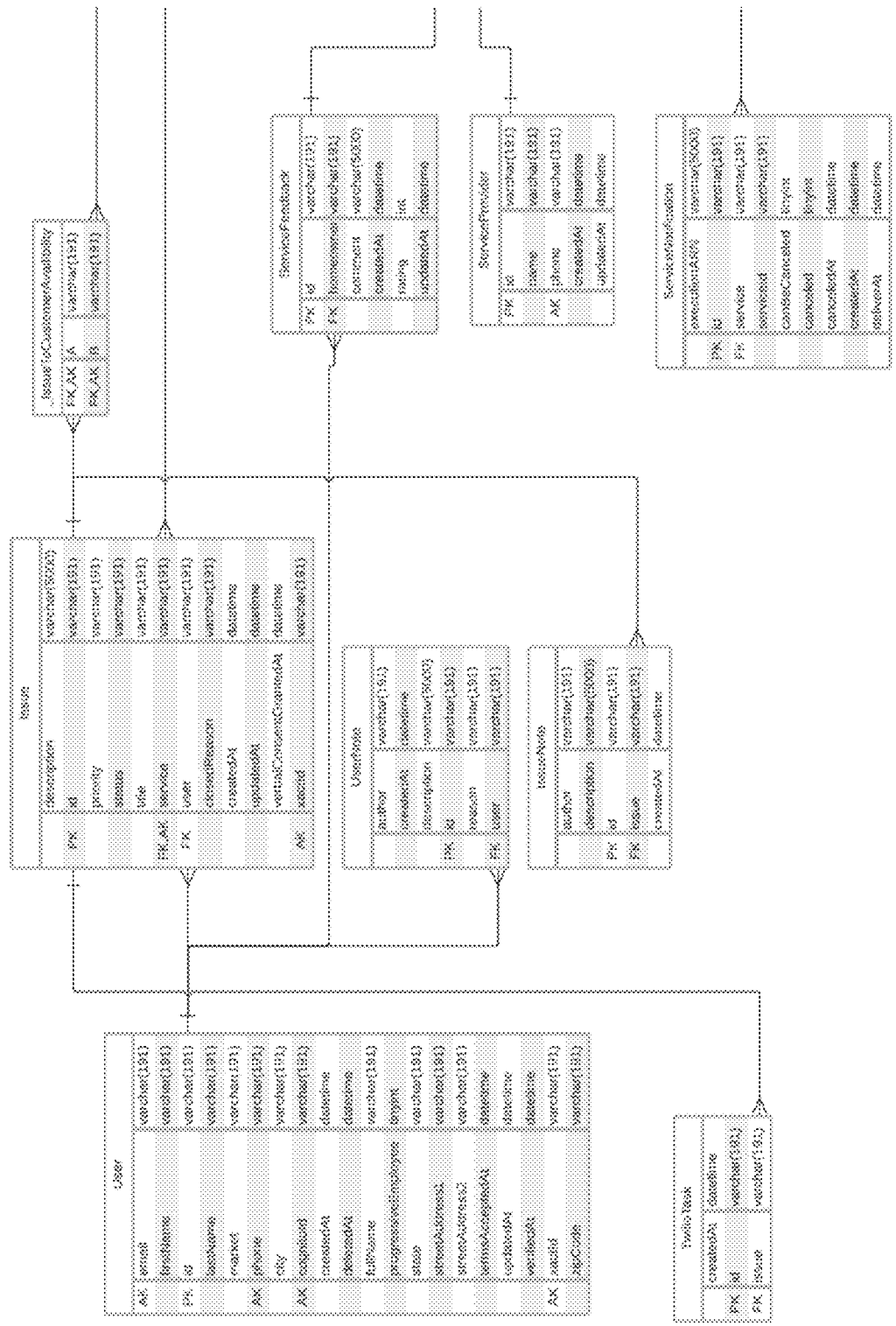
FIGS. 18 and 19 show an exemplary database schema.
Figure 19:
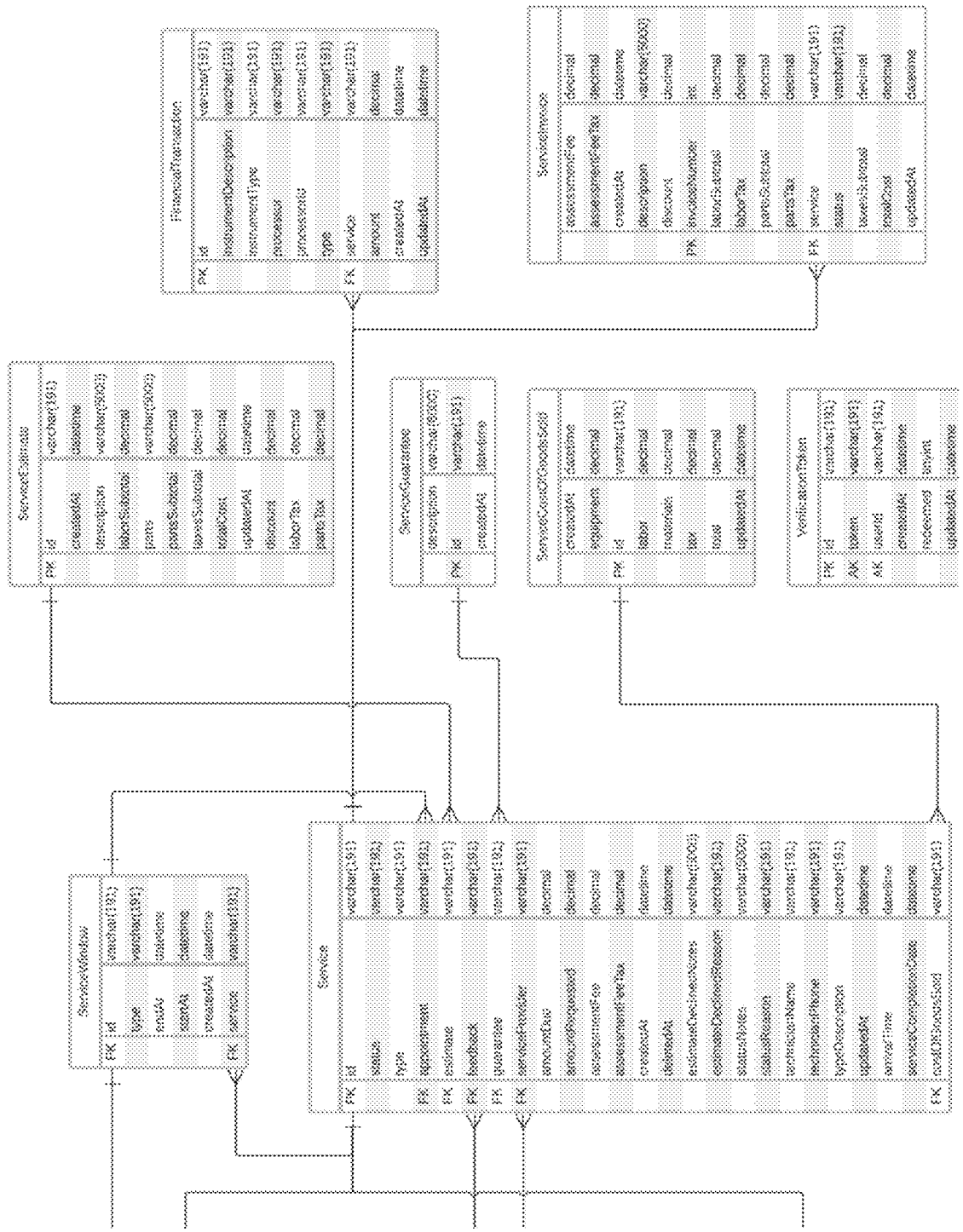

FIG. 16 is a block diagram of the automated resource management system that may comprise the systems shown in FIGS. 1 and 2, and executes the process flows described above and those shown in FIGS. 3-15 and 17-33. In FIG. 16, the controller 1602 interfaces the server cluster 108, API servers 142, and database services 1606 and database 120 (not shown), through an input/output (I/O) device 1604. The SQL database 120 and database 2020 may be distributed over several depositories and/or computers or maybe a unitary depository residing in cloud storage as shown. The databases 120 and 2020 may include several databases or database instances, and information from multiple sources types; and stores the data in a variety of different formats.

The controller 1602 interfaces the payment platform 134 in the form of a payments services cluster, authenticator server 130 in the form of an authenticator cluster, a media server 132 in the form of a media cluster and SQL instances 120. Some SQL instances 120 apply transformation functions (e.g., correlations functions, linear classification functions that normalize by feature, etc.) to generate surrogates for missing values and outliers, and perform data validations (e.g., via comparisons to acceptable data ranges) to reduce distortions in the stored data.

FIG. 17 is a block diagram of an alternate resource management system that may represent the systems shown in FIGS. 1, 2, 16 and 20, and executes the process flows and characteristics described above and those shown in FIGS. 3-15, 17-19, and 21-33. The system comprises processors 1702 and 1704 and a non-transitory media, such as a non-volatile memory (the contents of which are accessible by either of the processors 1702 and/or 1704). The input/output (I/O) interface 1706 and 1708 connects devices and local and/or remote applications, such as, for example, additional local and/or remote monitored devices. The memory 1710 and 1712 stores instructions, which, when executed by either of the processors 1702 and/or 1704, causes the resource management system to render some or all of the functionality associated with managing resources as described herein, such as a device the provides home repair services, for example. The memory 1710 stores instructions, which, when executed by the processor 1702, causes the automated resource management system to render functionality associated with the server cluster 108, API services 206, media server 132, authentication and authorization servers 130, the payment platform 134 (also referred to as the payments services server), an event archive 1716, a historical database 1714, database services 1606, and the RMS database 120. The memory 1710 and/or 1712 may also store instructions, which, when executed by the processor 1702 and/or 1704 causes the automated resource management system to render the functionality of and/or systems and modules associated with: a domain name system (DNS) 2004 (also referred to as the domain name system module) router, a DNS resolver, a top-level domain server (TLD server), a load balancing, a certificate manager module 2006, graph API 2038, a distribution module 2008, authentication modules 2010, a customer portal 2002, an operation's team portal 2046, a service provider portal 2048, a centralized or distributed database 2020, a secrets manager module 2022, storage service module 2024, a notification service module 2026, a step-function module 2028, serverless compute service modules 2030 and 2034, a customer engagement services module 2040, a metric repository module 2036, a pipeline module 2042, and/or a payment gateway 2050 too or exclusively.

The databases and/or memory 120, 1710, and 1712 (and shown in FIGS. 18, 19, and 29-33 may be distributed over several sites and/or computers, or may be a unitary depository or one or many cloud storage. The databases 120 and/or 2020, may include several databases and information from multiple sources types, and stores the data in a variety of different formats. The memory 1710 and/or 1712 stores instructions, which, when executed by the processor 1704, causes the automated resource management system to render functionality associated with the end-user-UI 104, the expert user interface 116, a customer site, the customer portal 2002, the operation's team portal 2046, and/or the service provider portal 2048.

In yet another alternate automated resource management system, the non-transitory media provided functionality is provided entirely through cloud storage that is part of the cloud services platform 140. In this resource management system, cloud storage and cloud services 140 and/or interface cloud enterprise 2018 provide ubiquitous access to the automated resource management system's resources and higher-level services that can be rapidly provisioned over one or more networks. Cloud storage and enterprises allow for the sharing of resources to achieve coherence services across many devices at many locations, and provides economies of scale.

The memory 1710 and 1712 and/or storage disclosed may retain an ordered listing of executable instructions for implementing the functions described above in a non-transitory computer code. The machine-readable medium may selectively be, but not limited to, an electronic, magnetic, optical, electromagnetic, infrared, or semiconductor medium. A non-exhaustive list of examples of a machine-readable medium includes: a portable magnetic or optical disk; a volatile memory, such as a Random Access Memory (RAM); a Read-Only Memory (ROM); an Erasable Programmable Read-Only Memory (EPROM or Flash memory); or a database management system. The memory 1710 and/or 1712 may comprise a single device or multiple devices that may be disposed on one or more dedicated memory devices, or disposed on a processor or other similar device.

Figure 20:
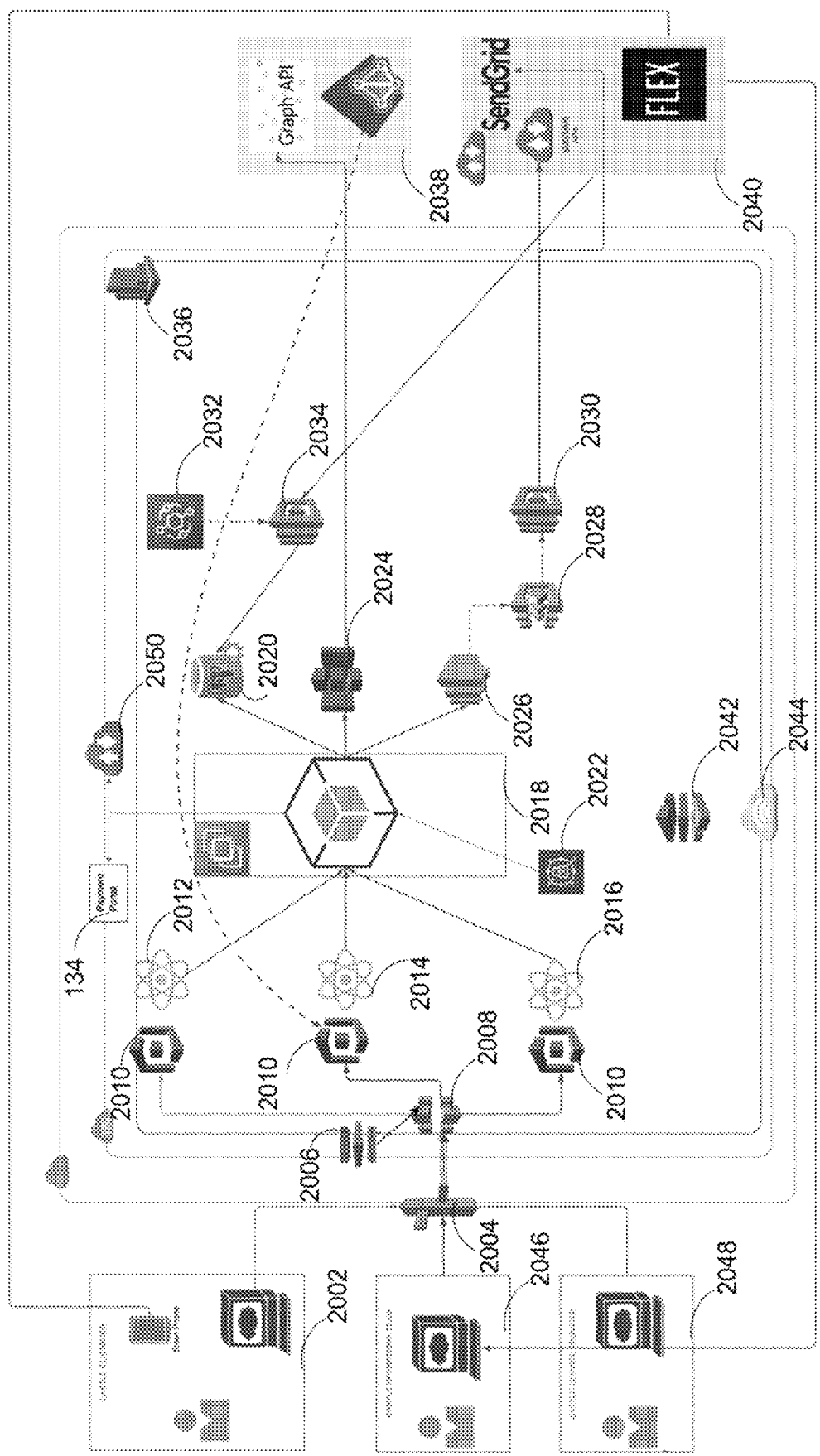
FIG. 20 is a third alternate system diagram of a resource management system serving three or more portals.

FIG. 20 is a third alternate system diagram of a resource management system that is embodied in cloud services platform 140 or cloud enterprises and/or a locally hosted enterprise system (e.g., a non-cloud-based system hosted in a local data center). The system is employed through a modular architecture that separates functions and makes software code and hardware implementations more adaptable to other software, easier to service, and easier to update than monolithic programs. The systems subdivide functions into separate modules allowing the modules to be utilized with a variety of other functions along with other components of this and other systems. The design ensures consistency, efficiency, and flexibility when serving applications.

Access to the resource management system occurs through three or more portals (three are shown). The customer portal 2002 comprises a homeowner portal in some exemplary home repair systems. Through the customer portal 2002, the user is routed to a domain name system (DNS) 2004 router that routes the user to an instance of the resource management system cloud application. The user's request for the application is routed to a DNS resolver, which forwards the request to a DNS root name server and a TLD server that maintains the domain names that share common domain extensions, such as .com, for example. The TLD server responds to the request with the names associated with the requested domain. The DNS resolver then caches the name and/or Internet Protocol (IP) address of the requested domain in memory so that the next time a browser and/or app requests that domain the association is already established in frequently used memory. The DNS resolver also looks into the requested geographic zone for the requested records, retrieves the IP address for the network server serving the requested content, and returns the IP address to the DNS resolver, which is then returned to the user, usually through the users' browser and/or users' apps.

In FIG. 20, the domain name system module 2004 transmits automated requests over publicly accessible networks, like the Internet, and/or private networks even when user requests are not made. The automated requests to the resource management system's resources are used to verify that the resource management system's resources and/or domain(s) are reachable, available, and/or functional. In some resource management systems, when notifications are received indicating that the resources are unavailable or unable to perform a task, the domain name system module 2004 routes the traffic (or prepares to route traffic when not processing/serving a user request also known as an unrequested transmission) to the unavailable resource(s)' proxy, ensuring that the system is always functional and/or operating as designed. The automated requests also allows the domain name system module 2004 to route traffic away from infected or unhealthy resources, effectively isolating those resources and preventing the spread of infected transmissions to other resources and/or sites. In some systems, the domain name system module 2004 interfaces or is integrated with an elastic load balancing module that automatically distributes incoming traffic across multiple resource management system resource instances. The combination detects inaccessible and/or unhealthy instances of resources and routes the traffic to accessible or healthy alternative resources until the originally intended resources are restored to their healthy state.

To ensure that resource management systems are secure, a certificate manager module 2006 issues certificates and in alternate systems, imports third-party certificates such as certificates from the certificate manager that resides in the graph API 2038 in some systems. The certificates are used to identify users, servers, and/or things when communicating over networks to sign and/or document the data of the communication. The certificates are domain validated, meaning that the certificates are validated by a communication exchange with the domain name system module 2004. The certificates have a validity period that can be renewed. In some instances, certificate use is logged in memory, and in other instances, the resource management systems opt out of logging certificate use to prevent exposure of the resource management systems' internal networks and/or resources in the event the resource management system or instances of it are penetrated or attacked.

In FIG. 20, a distribution module 2008 services users by delivering content and resources responsive to user requests by transmitting the requested exchanges to edge locations resources once authenticated. An edge location is one or more sites and/or cache proxies and/or cache servers that the resource management system caches or stores copies of content and transmits that content in response to requests. The edge locations provide faster response times and content delivery to users at any geographic location. The cache and/or proxies may comprise a hardware cache. Some edge locations further provide data processing, analysis, and/or storage locally and/or close to the geographic location of the original users' request or close to the endpoints of the exchange. For example, in a use case, when an end user requests content, some distribution modules 2008 route the user to an edge location or site that serves cache copies responsive to the user's request consistent with the users' access rights. When a homeowner, for example, is seeking resources, the distribution module 2008 routes the request to an edge location in proximity to the homeowner (e.g., the homeowner being the user in this use case) that provides the lowest latency in responding to that user's request once the homeowner is authenticated. The use of an edge location ensures that content is delivered as quickly as possible. If the content is resident to the edge location it is delivered without delay and if it is not resident to the edge location it is retrieved and served from the content source and cached and/or stored at that edge location and/or a cache proxy serving that edge. To increase reliability and availability, objects (e.g., files holding content) are cached at and between two or more edge locations in some alternate systems.

Authentication modules 2010 (three are shown) and Graph API modules' 2038 active directory provides authentication, authorization, access rights, and/or management for web and/or mobile access for each of the customer's portal 2012 (e.g., in this case the homeowner), the operations' portal 2046, and the service provider portal 2048. Users sign on with multifactor credentials that are compared against authorized credentials, and when matches are confirmed, access is granted to the extend specified in the permissions lists and/or rules for that user. In this multiuser system, functions that access a particular resource is granted by means of the user's account and are granted by an administrator that is stored in a permission profile stored in memory and verified when a user attempts to access a resource. The resources includes a shared calendar served by the Graph API module 2038 that allows users, such as homeowners, operational users, and/or service providers to schedule meetings and/or other events together through their respective portals (e.g., the customer portal 2002, the operation's team portal 2046, and the service provider portal 2048).

In FIG. 20, a document object model defines the logical structure of the files and/or the documents and how the resources may be accesses and manipulated. The document object model is created in virtual memory through the operation of multiple user interface (UI) portals 2012, 2014, and 2016 that in FIG. 20 serves customers (e.g., homeowners), operations management, and service provider UIs, for example. The user interface portals 2012, 2014, and 2016 are created using a declarative and flexible JavaScript library which renders the view layer of the application. The view renders the presentation of model data. The view comprises composited layers that include a presentation layer that prepares and presents the data for the application layer in an accessible and efficient manner.

The exemplary customer, operations management, and/or service provider user interfaces interacts with instances of an elastic compute cloud 2018 (referred to as a compute cloud or computing cloud) that provides scalable computing and scalable computing capacity. Scalable refers to the resource management system's ability to increase or decrease its processors (the number and capability), its memory capacity, and/or its network capacity in response to changes in application and/or system processing demands. The computing cloud 2018 provides various configurations of processors, memory, and/or network capacity (e.g., some processors are in continuity with the memory and the network, and some are in communication with and/or through them) and stores volumes of data that is deleted when the instances stops, hibernates, and/or terminates. In some use cases, data is persisted through an open sources distributed and/or local object-relational database 2020 that uses and extends the structured query language (SQL) with features that store and scale complex data (e.g., a composite of existing data types). The database 2020 features transactions with Atomicity, Consistency, Isolation, Durability (ACID) properties, automatically updatable views, materialized views, triggers, foreign keys, and stored procedures. The database 2020 handles a range of workloads, from single machines to data warehouses and/or Web services supporting many concurrent users including customer/homeowner users, operations management users, and service provider users, for example. Some alternative instances of the open sources object-relational database 2020 are an in-memory databases that reside completely or partially in a main memory, such as a volatile memory including memory that holds data temporarily rather than a file system. It provides faster processing than conventional databases and in some systems, is persisted for reuse by a backup system when processing stops, when the systems hibernate, and/or when a process terminates as planned or unexpectedly. In FIG. 20, the database 2020 supports a query language such as GraphQL, for example, that comprises a query language for application program interfaces (APIs) and a runtime for fulfilling the query. Unlike some query languages (such as SQL, for example), GraphQL is not used to query a particular type of data store (such as a MySQL database). Instead, GraphQL is used to query data from a variety of different sources such as a database, micro-service, or even an underlying RESTful API, for example. GraphQL is source agnostic, it runs on a server, and is usually served over hypertext transfer protocol (HTTP).

Unlike systems that embed credentials directly in application accessing the database 2020 directly, the secrets manager module 2022 is used to retrieve secrets, such as credentials and passwords through programming requests. By removing secrets directly from applications accessing the database 2020, secrets are not compromised when code is exposed because they are not hard coded within the software. The secrets manager module 2022 automatically rotates secrets according to a predetermined schedule and allows the resource management system to replace secrets further reducing the risk of exposure. An exemplary secret can include the server name serving the instance of the database 2020, an IP address, a port number, a timestamp, and a user name and password to sign into the service making is unique. The secrets manager encrypts the protected data through a key management service that creates and controls the symmetric and asymmetric cryptographic keys.

In use, a database administrator or administrator program creates the credentials used to access the database 2020 with the associated permissions, which are stored in the secrets manager module 2022. The secrets manager module 2022 encrypts and stores the credentials with the secret as a protected secret. When an application accesses the database 2020, the application queries the secrets manager module 2022 for the protected secret. The secrets manager module 2022 retrieves the protected secret, decrypts the protected secret, and returns the secret to the application over a secure channel. The application parses the credential, the connection string, and other required information from the response and serves it to the database server to access the instance of the database 2020.

A storage service module 2024 in communication with the computing cloud 2018 stores a range of storage classes for different use cases. For example, a service provider may store estimates and pictures that may be further processed to create and/or read estimates for homeowner services. The data can be stored with changing or unknown accesses patterns, which optimizes storage costs by automatically moving data between multiple storage tiers (e.g., two, three, four, or more storage tiers) when access patterns change. Some storage tiers include low-latency access tier optimized for frequent access and some storage tiers include an archive access tier for asynchronous accesses or rarely used data, for example. Storage service module 2024 stores the data synchronously or asynchronously in one of multiple of storage tiers based on the access frequency and/or access patterns. Some storage service modules 2024 include a lifecycle configuration to manage storage requirements and maintain costs. The objects may be assigned an expiration. Further, some objects can be locked to prevent objects from being deleted or overwritten. A read-only designation may add another layer of protection against deletions and/or changes. Further, some storage service modules 2024 include auditing processes that track object creation and access of objects for their lifetime or up and until their deletion.

The resource management systems' notification service module 2026 coordinates the delivery and/or sending of messages to subscribing clients through the computing cloud 2018. In publishing mode, the notification service module 2026 communicates asynchronously with subscribers by producing and transmitting messages. The notification service module's subscribers receive and consume the messages and/or notifications such as short messages and/or emails.

In FIG. 20, a serverless orchestration service module shown as a step-function module 2028 routes the publications and/or receives the subscriptions through a serverless compute service module 2030. For example, when the resource management systems' notification service module 2026 publishes a communication to a subscriber by sending a short message service (SMS) message on a topic subscribed by customers/homeowners and/or service providers, the notification service module 2026 subscribed to that event creation invokes the compute service 2030. The compute service 2030 runs code without provisioning or managing servers. It delivers message through a customer engagement services module 2040 that handles such communication, such as the short message service. The customer engagement service module 2040 support short message service or texts, emails, and/or voice interactions allowing the resource management systems to support direct interactions with customers and service providers through multiple channels. In some alternative systems, the customer engagement service module 2040 supports chat/or and video communications through application programming interfaces.

In FIG. 20, the customer engagement service module 2040 comprises an omnichannel contact interaction that integrates different methods of communication from the customer/homeowner and service provider to an operations exchange. The operations exchange comprises a channel that facilitates dialogue and/or personalized interactions. In some instances it may comprise connections with a customer/homeowner or operations facing employee, and in alternate instances comprises connections with an automated service, such as those rendered by chatbot engines disclosed in patents and patent applications including application Ser. No. 16/810,678 that issued as U.S. Pat. No. 11,038,821, application Ser. No. 16/374,495 that issued as U.S. Pat. No. 10,601,740, application Ser. No. 15/982,881 that issued as U.S. Pat. No. 10,148,600, Ser. No. 16/405,552 that issued as U.S. Pat. No. 11,297,016, and Ser. No. 17/703,619 that issued as U.S. Pat. No. 11,438,283, which are currently assigned to the assignee of this disclosure and are herein incorporated by reference in their entirety.

In FIG. 20, a serverless service module 2032 connects the customer engagement service module 2040 to database 2020 through a second serverless compute service module 2034. The serverless compute service module 2032 uses communication events to connect the event to the records in database 2020. In operation, the resource management system ingests the communication, filters the communication to the tasks to be completed, and/or transforms the information so that it can be stored in database 2020. When a communication event occurs, the event is detected and the serverless compute service module 2032 applies one or more rules that routes communication data to the second serverless compute service module 2034 that creates and/or updates one or more records in the database 2020. The endpoints of the second serverless compute service 2034 and the database 2020 are established by one or more rules applied by the serverless compute service module 2032.

To monitor the resource management systems' operations, a metric repository module 2036 stores retrievable metrics generated by the computing cloud 2018. Some metrics repository modules 2036 calculate statistics and generate and render data graphically upon demand. Some metric repository modules 2036 are configurable and render an alarm and/or notification that can start, stop, and/or terminate a computing cloud instance when a predetermined criteria is met. In some systems, the metrics repositories issue notifications through the notification service module 2026. In some alternative systems, when the metric repository modules 2036 detect system instances or module failures and/or volatility (e.g., inconsistent operation before a failure occurs), the metric repository modules 2036 initiate remediation by suspending and/or isolating the system instances and/or one or more modules during or just before a failure and/or volatility occurs. Detections may occur by comparing metrics tracked by the repository module to pre-event conditions and/or pre-failure condition profiles that represent pre-failure conditions that precede resource and/or resource management system failures. The metric repository modules 2036 may stop and/or isolate those system instances and/or one or more modules when the pre-event, pre-failure, or failure conditions occur (actionable conditions), and in some systems, launch new/replacement system instances and/or one or more replacement modules at or near the isolated resource management system instances and/or one or more of its modules. The new/replacement system instances and/or one or more replacement modules are launched at the current operating state of the resources or previously deployed system prior to the failure and/or volatile operating condition. By recognizing actionable operating conditions, some alternative repository modules 2036 maintain system availability and stability when the resource management systems and/or one or more of its modules become infected, unstable, come under attack, and/or begin to show characteristics that precede such conditions.

To ensure that the resource management systems' operations perform consistently, the resource management system operates in pipelines, in which each stage comprises a series of stages that are represented by the pipeline module 2042. A stage comprises a logical unit that can isolate an environment and limit the number of changes and/or concurrent changes in that instance. The environment comprises a runtime environment and a stage comprises a serial or a parallel action. An action comprises one or more serial or parallel operations performed by the application code that is configured so that the actions run in the pipeline. While pipelines process multiple executions at the same time, a pipeline stage processes one execution at a time locking the stage while the process completes its execution.

In some use cases, the resource management system is hosted in a network-based code hosting platform as represented by a cloud based 2044 and/or non-cloud-based locally hosted enterprise system hosting platform. The hosting platform allows for collaboration and version control by tracking changes and provides seamless integrations with third party tools and user interface integrations. For example, a payment gateway 2050 interfaced to a payment platform 134 allows the resource management system to process different payments from Web and mobile platforms. The payment methods include credit cards, debit cards, digital wallets (e.g., Venmo®), contactless payment technology (e.g., Apple® pay, Google® pay, etc.), ACH direct debits, etc. In FIG. 20, alternative resource management systems outsource payments to different third party external gateways.

Figure 21:
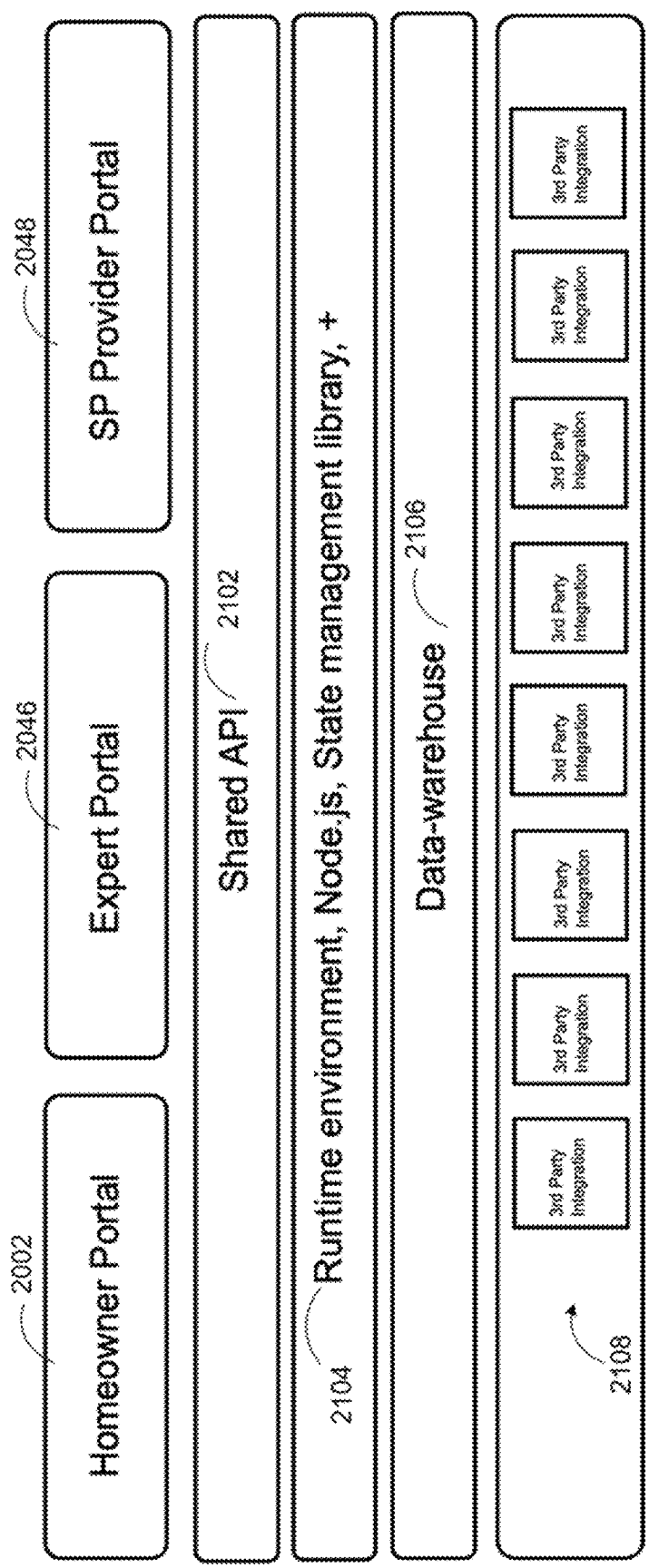
FIG. 21 shows the interfaces of an exemplary turnkey home repair process executed on the resource management system of FIG. 20.

Three portals 2002, 2046, and 2048 communicate with a shared application programming interface in an the resource management system of FIG. 21. The portals 2002, 2046, and 2048 allow the shared application programming interface 2102 to publish, one or more documents and interact with the shared application programming interface 2102. The shared application programming interface 2102 communicates with an asynchronous event-driven JavaScript runtime environment 2104 designed to support scalable resource management system applications and a node.js application that supports single page, multipage, and hybrid applications. The shared application programming interface 2102 has access to a comprehensive state management library for JavaScript that enables the system to manage both local and remote data with GraphQL. The state management library fetches, caches, and/or modifies application data, while automatically updating the shared application programming interface. The data is retained in a data store or data warehouse 2106 accessed by web, mobile, geospatial, and/or analytic applications. The data warehouse 2106 is not limited to supporting Java and JavaScript as it supports Python, Hypertext Preprocessor (PHP), Perl, Tool command language (Tcl), Net, C, C++, Delphi, Java, JavaScript (Node.js), and more by its use of PostgreSQL. The third layer 2108 shown in FIG. 21 integrates third party applications such as Amazon® Web Services (AWS), Braintree®, PayPal®, Twilio®, Microsoft Exchange, (Microsoft®) MS Azure®, etc., for example.

Figure 22:
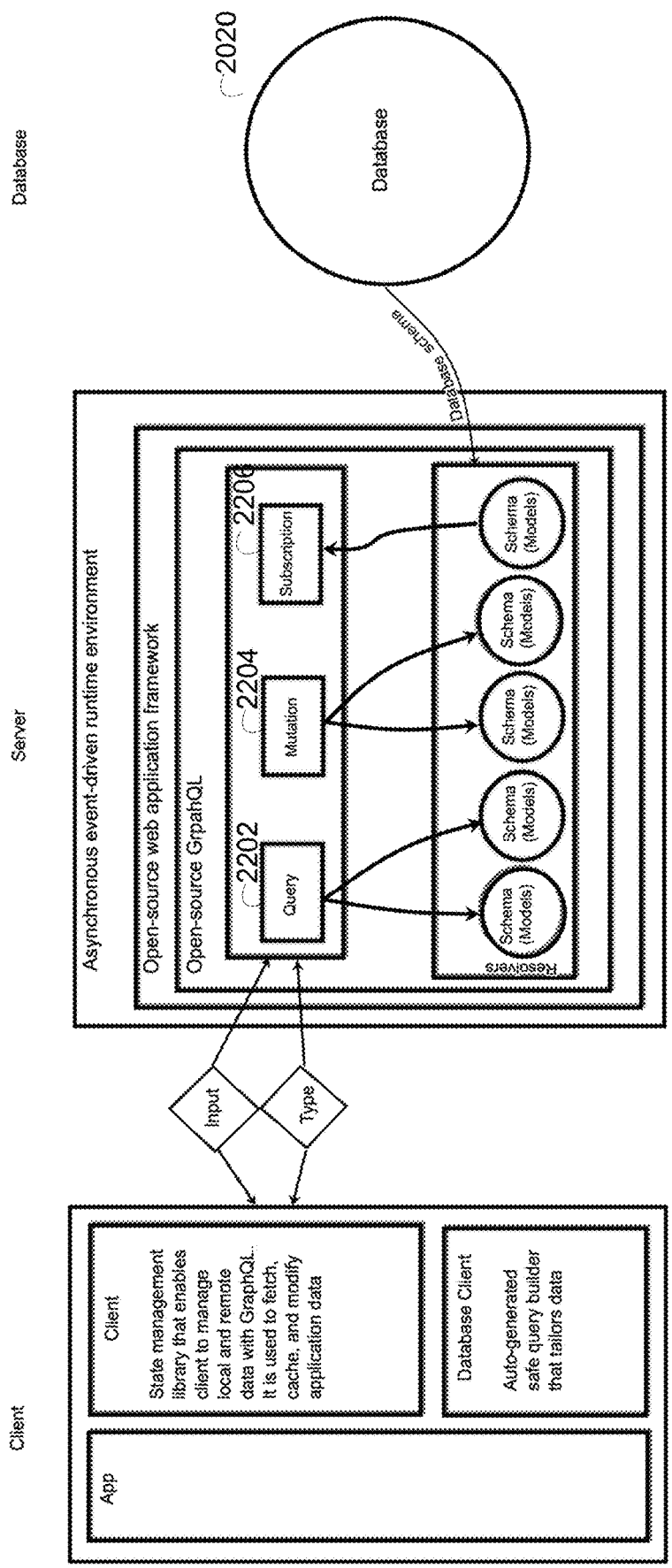
FIG. 22 shows the architecture of the resource management system of FIG. 20.

In FIG. 22, the data warehouse 2106 comprises the database 2020 that interfaces the open source Graph QL schema. The Graph QL schema provides access to the collection of files that specify the data sources of the resource management system, the client to be generated (e.g., via generators that determine the asset to be generated), and data model definitions. The data model definitions specify the application models (e.g., the shape of the data per source) and their relation. The data models represent the entities of the resource management system's application domain. A relation is a connection between two models in the schema.

The open source GraphQL accesses the schema through queries 2202, mutations 2204, and subscriptions 2206. A query can either be a request for data results from the resource management database 2020 or a request for action on the data, or for both. A query 2202 can answer a question, perform calculations, combine data from different sources, and add, change, and/or delete data from the database 2020. A mutation 2204 is a GraphQL operation that allows the resource management system to insert new data and/or modify the existing data locally. A subscription 2206 is a request for information about a subject without needing to know anything about the applications that are publishing the information.

Through a Java Script runtime and open source application framework, information is exchanged with a client by commands such as fetching, caching, and/or modifying application data and automatically generating type-safe queries through a query builder.

Figure 23:
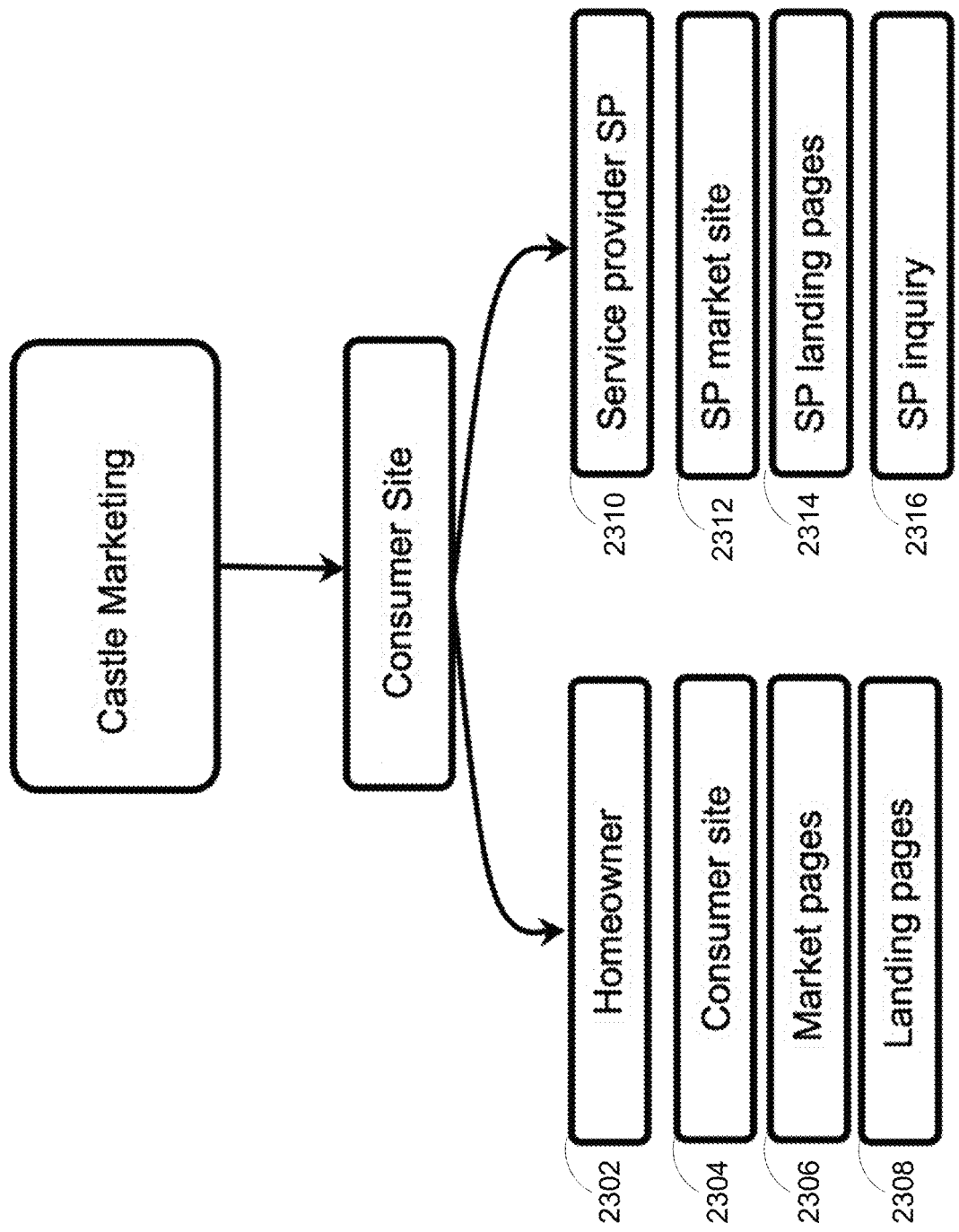
FIGS. 23 and 24 are architectural diagrams of an exemplary home repair process executed on the resource management system of FIG. 20.

FIG. 23 shows the functions rendered by an exemplary home repair service site accessed through mobile devices or a personal computer such as through a browser or through the exemplary home repair mobile app referred to as Castle. As shown, a Castle marketing Web site supports both homeowners and service providers. The homeowners are granted access a homeowner domain 2302 that serves landing pages 2308, a consumer site 2304, and marketing pages 2306. Service provider credentials provides access to a service provider domain 2310 that serves service providers marketing sites 2212, landing pages 2314, and service inquiries and forms 2316.

Figure 24:
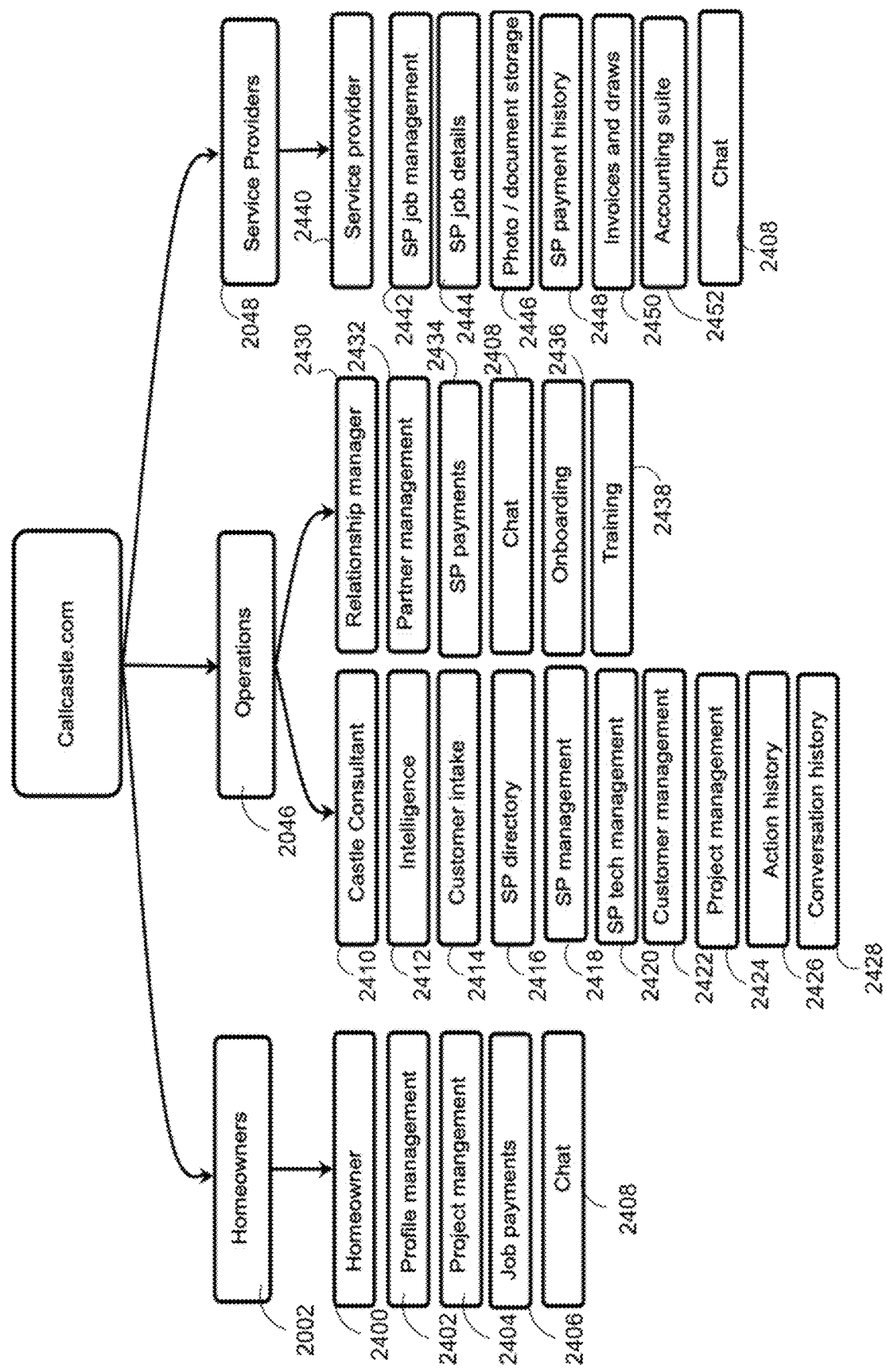
Figure 25:
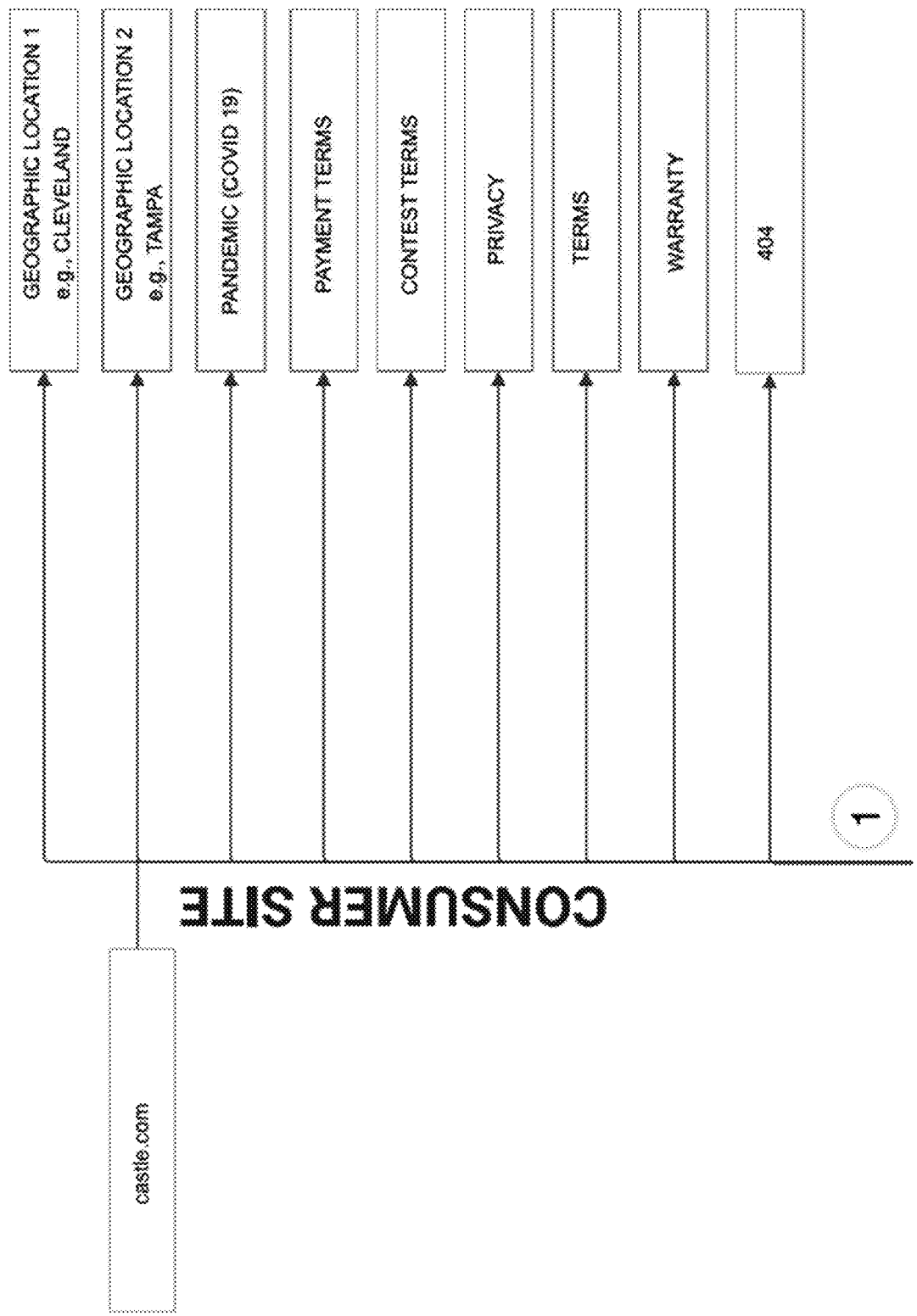
FIGS. 25-28 show a logical relationship of a consumer portal, a homeowner portal, an operational portal, and a service provider portal through sectional views interfacing an exemplary turnkey home repair process executed on a resource management system.
Figure 26:
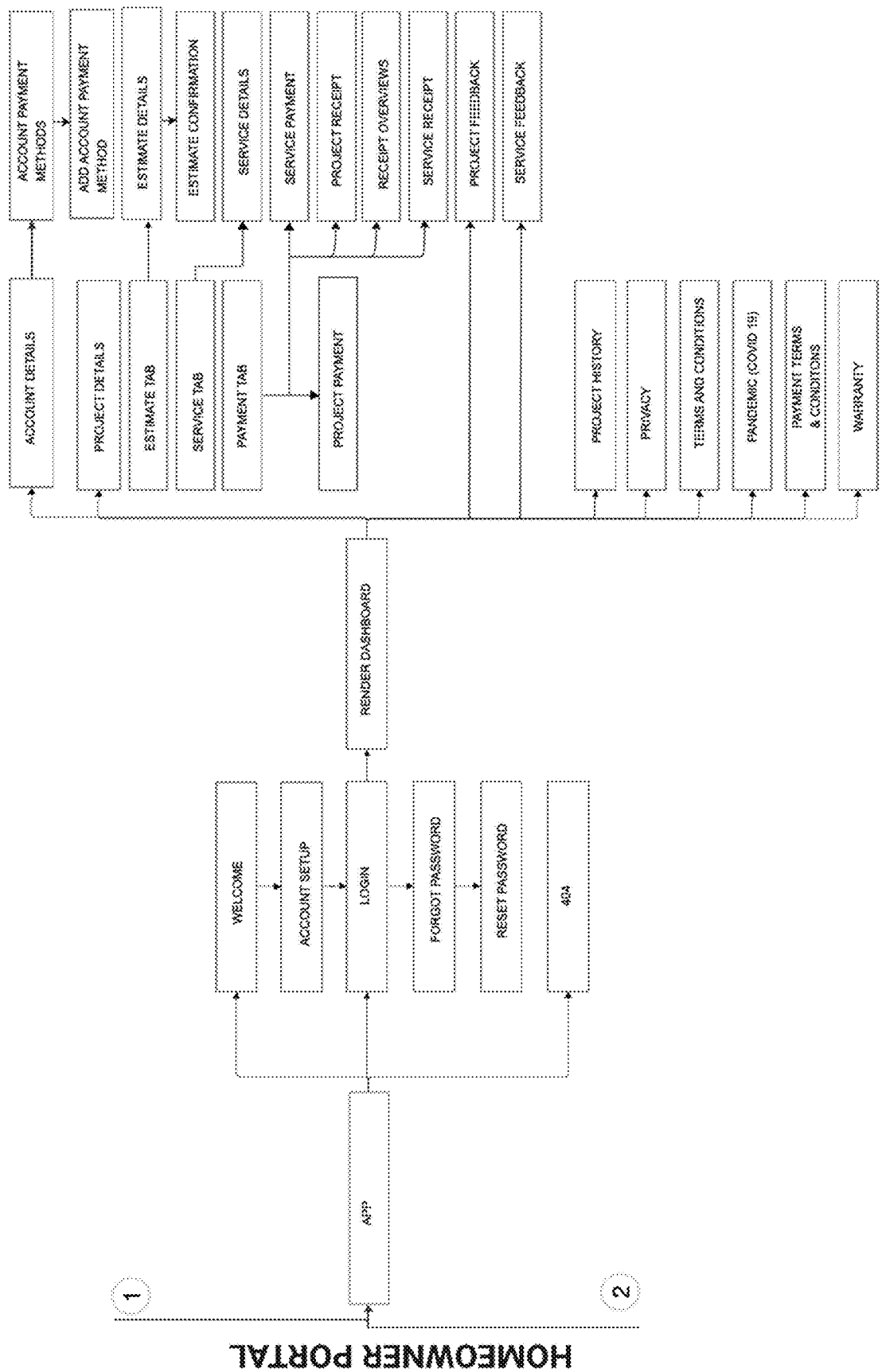
Figure 27:
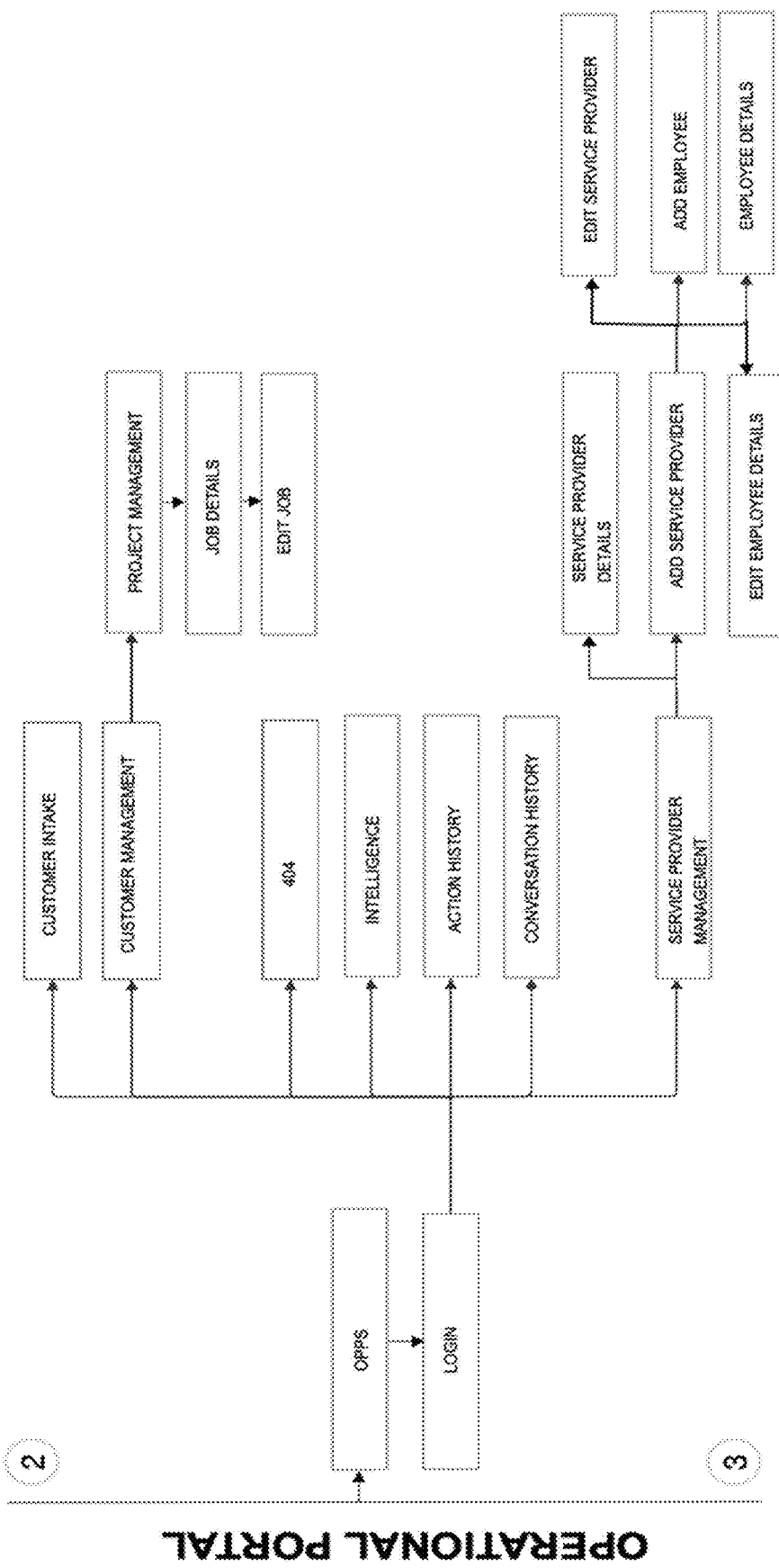
Figure 28:
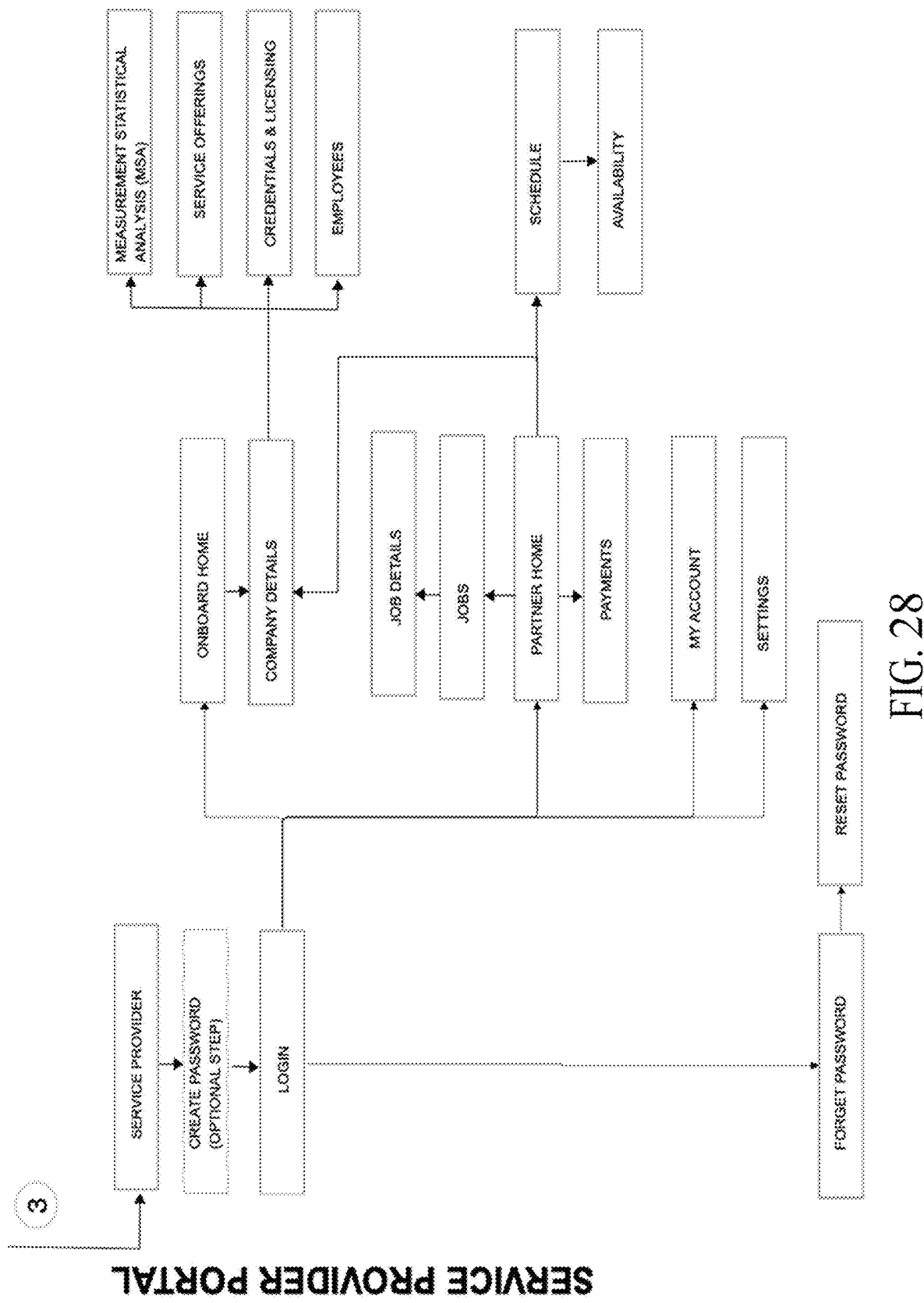
Figure 29:
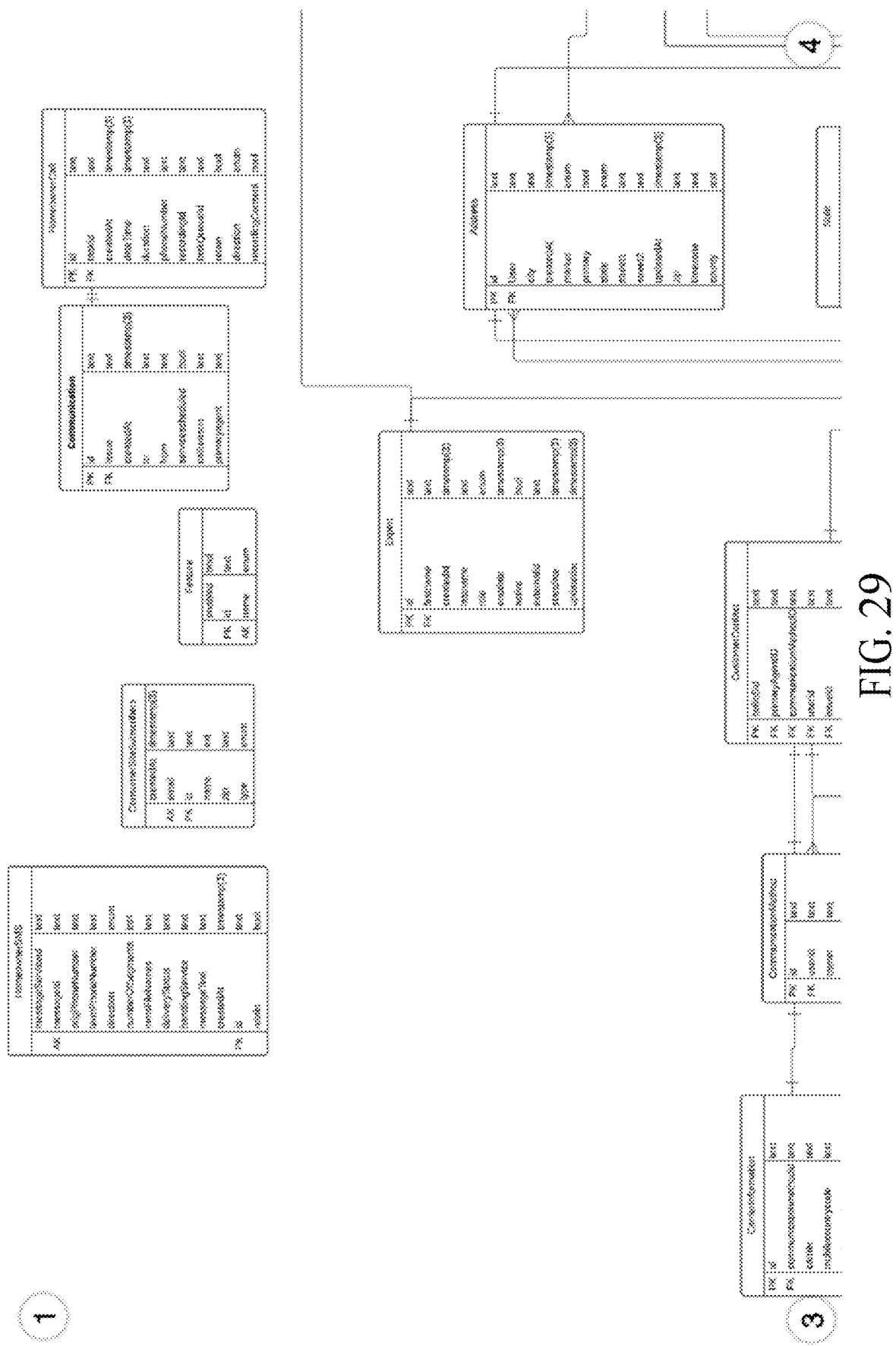
FIGS. 29-33 show a second exemplary database schema through sectional views.
Figure 30:
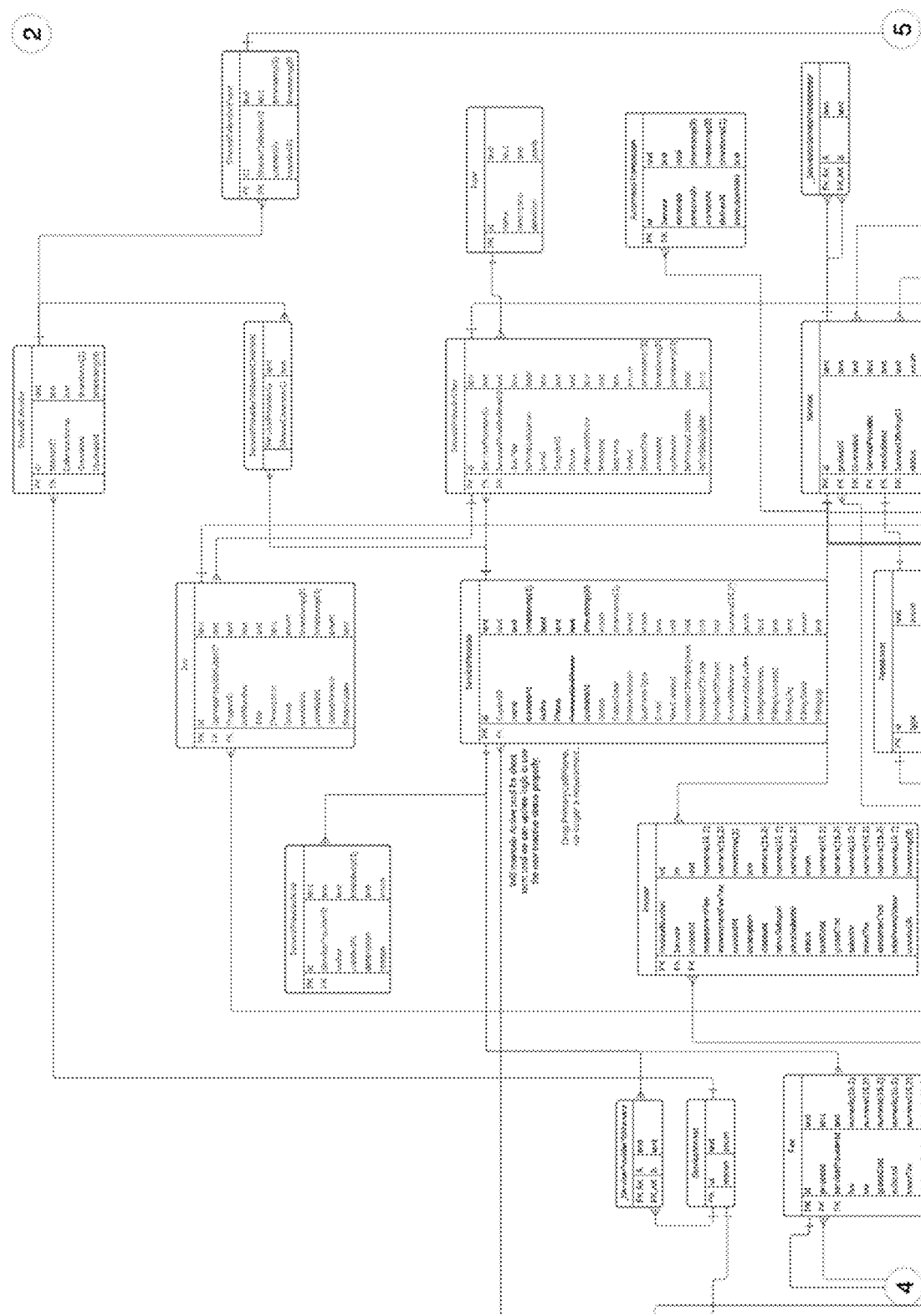
Figure 31:
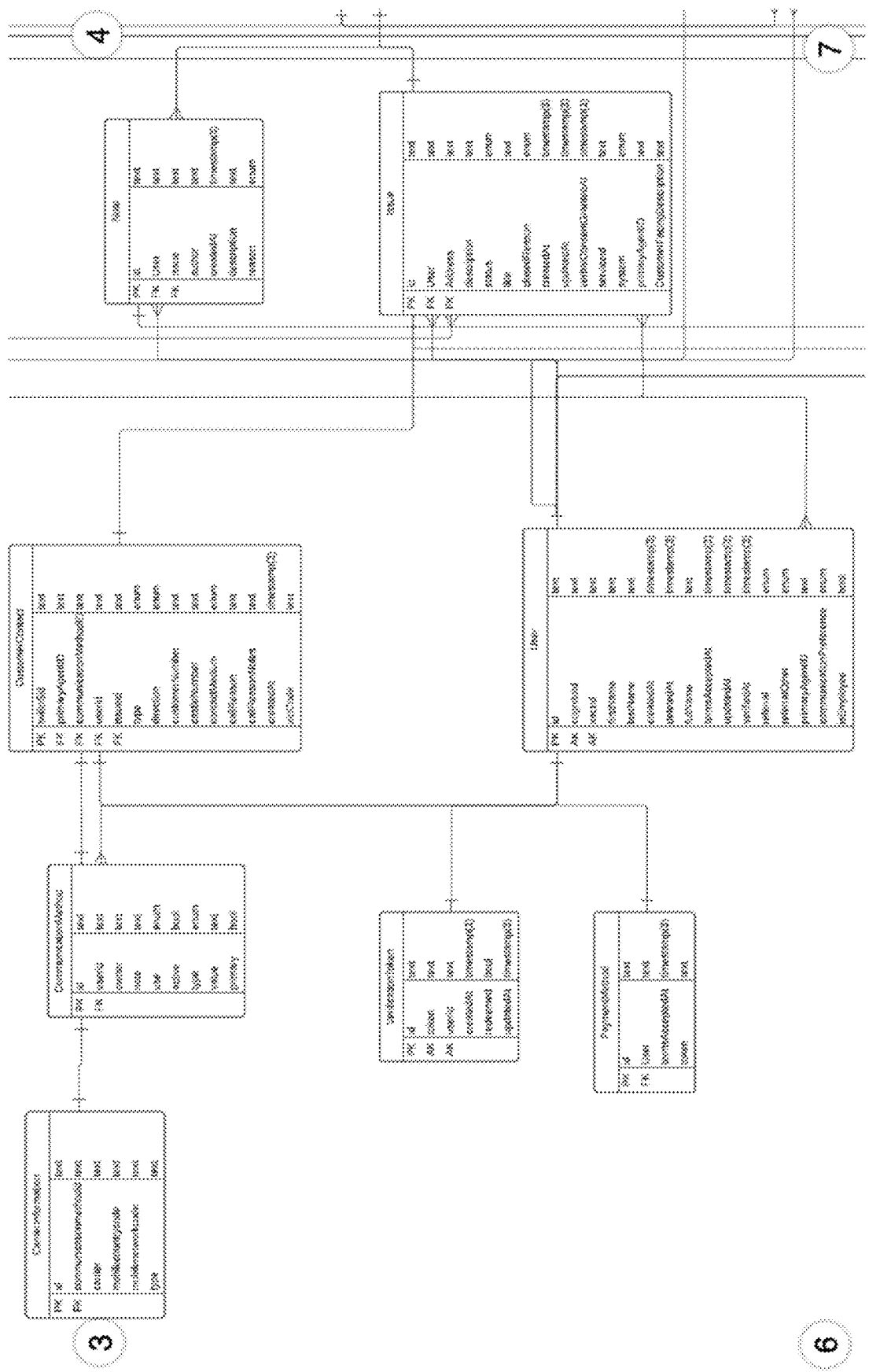
Figure 32:
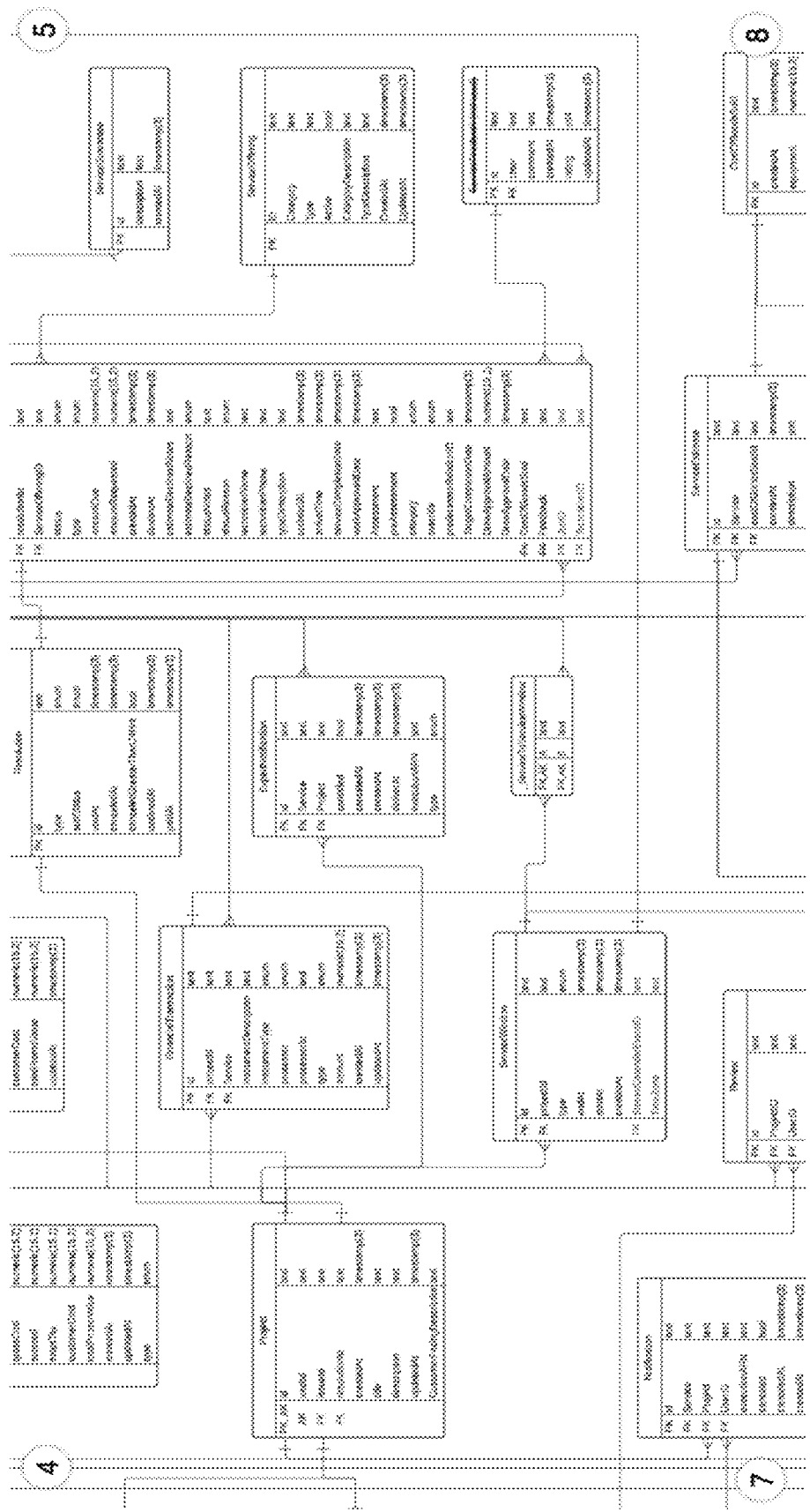
Figure 33:
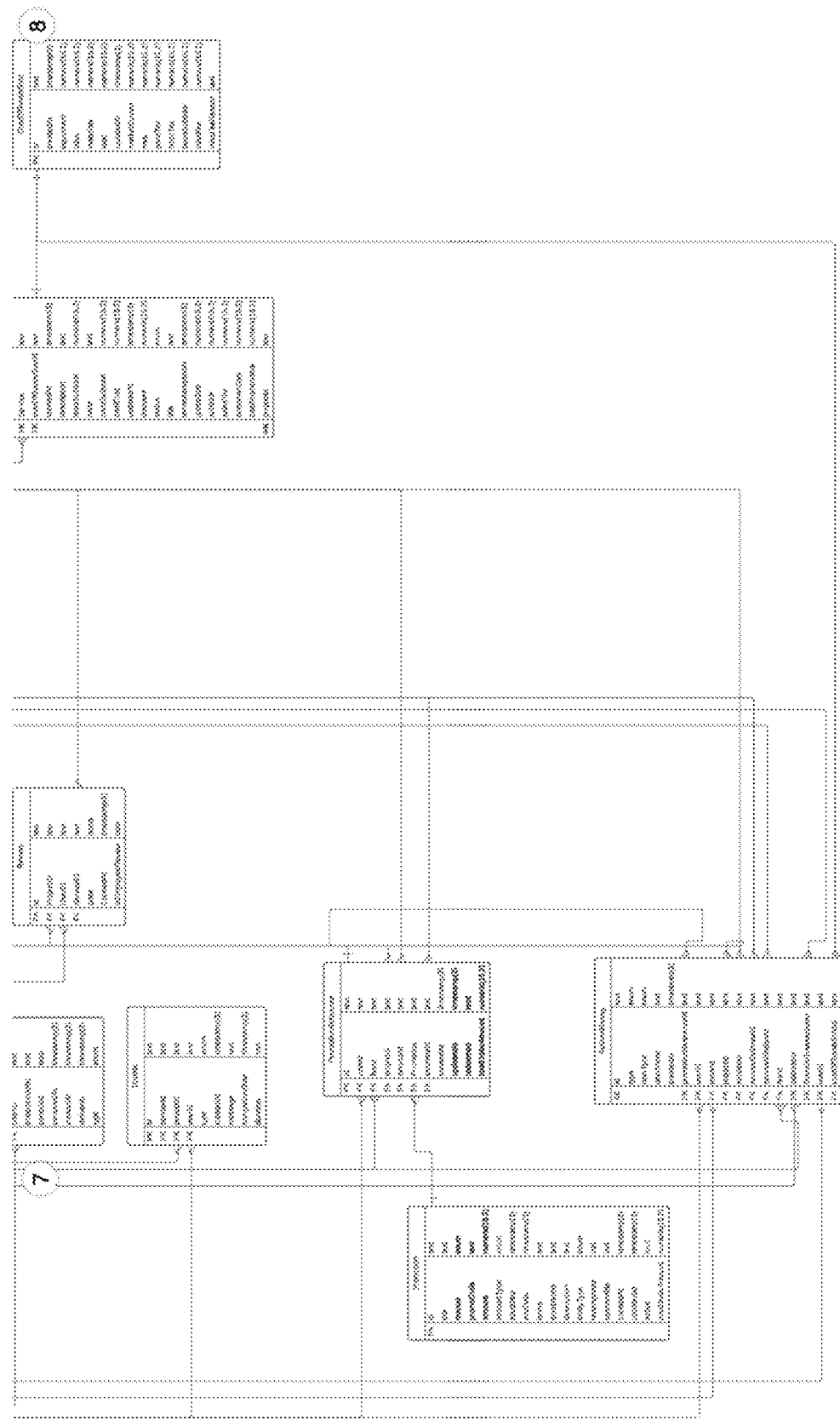

Three directories also serve homeowners, operational employees, and service providers through the homeowner portal 2002, operations portal 2046, and service provider portal 2048, respectively as shown in FIG. 24. The homeowner portals 2002 provide access to the homeowner domain 2400, a profile management module 2402, a project management module 2404, a job payment module 2406, and an optional chat module 2408. The profile management module 2402 provides a collection of settings and information associated with the homeowner. It contains information used to identify an individual, such as their name, age, address, portrait photograph of the individual and/or home and/or projects, and individual characteristics. The project management module 2404 may comprise software that is dedicated to the planning, scheduling, resource allocation, execution, tracking, and/or delivery of homeowner repairs. The job payments module 2406 may comprise software that manages payments. Some systems include three components: a payment processor that manages payment transactions, a payment gateway that handles payments by connecting online users to the payment processor, and a merchant account and/or third party vendor that sends details between the customer's bank or paying source and the merchant's bank and/or third party vendor. The optional chat module 2408 comprises software that provides a service that allows customers and others to message, or "chat" with others and/or with artificial intelligence (AI) in real-time from their device while they're on online. Optional chat module 2408 generates chat window where users can interact with each other and/or AI via instant messages through a short message service (SMS).

The operations portal 2046 provides access to a Castle consultant domain 2410 and a Castle relationship manager domain 2430. The Castle consultant domain 2410 serves a business intelligence dashboard 2412, a customer intake module 2414, and a service provider directory 2416. The business intelligence dashboard 2412 comprises a suite of products (e.g., software) and tools that automatically monitor, analyze and/or plan functions executed by the resource management system using scorecards, dashboards, management reporting and/or analytics. The business intelligence dashboard 2412 also includes the following tools: SQL Server Analysis Services (SSAS), SQL Server Integration Services (SSIS), SQL Server Reporting Services (SSRS), and PerformancePoint Services (PPS). The customer intake module 2414 streamlines homeowner and project acceptance, captures key information, and minimizes manual processing by streaming and flowing data between integrated and interfaced system. Some customer intake modules 2414 achieve auditable compliance with the resource management system's requirements and external regulatory requirements throughout the onboarding process. Some customer intake module 2414 generates audit reports that assess compliance with system rules, security policies, and user access controls. The service provider directory 2416 is a listing of service providers under contract with the resource management system and/or provider of the system that is prepared by the resource management system as a reference tool to assist homeowners and/or operations users in locating service providers that are available to provide services to customers and/or homeowners.

The Castle consultant domain 2410 further serves a service provider management module 2418, service provider technical management module 2420, customer management module 2422, and project management module 2424. The service provider management module 2418 and service provider technical management module 2420 are modules that manage service providers and homeowner repairs and provide technical support. The customer management module 2422 stores customer contact details and keeps those details up to date. The customer management module 2422 tracks every customer interaction and manages customer accounts. The project management module 2424 comprises software that facilitates project planning, scheduling, resource allocation and/or change management. The project management module 2424 allows service providers, operation members, and/or users to control costs and manage budgeting, quality and/or documentation and also support an administration system. Project management software is also used for collaboration and communication between project stakeholders.

The Castle consultant domain 2410 also serves an action history module 2426 and a conversation history module 2428. The action history module 2426 renders an action history table that shows what actions users have performed in response to a notification associated with a date. The action history table includes a row for each previous execution of the same notification activity node in a process, as well as a row for the initial submission of the process. The conversation history module 2428 provides an interface for browsing conversations between users, such as conversation between service providers, homeowners, and operational users stored in memory. Some conversation history modules 2428 provide summaries of those conversations that are stored in memory (e.g., distilled or summarized through artificial intelligence, such as by chatGPT a language model developed by OpenAI®, for example).

The Castle relationship manager domain 2430 serves company partner management modules 2432, service provider payments module 2434, the optional chat module 2408, an optional onboarding module 2436, and an optional training module 2438. Some company partner management modules 2432 comprise software that streamlines and automates management processes that decrease the complexity of large homeowner projects and/or service provider tasks, with other software that enables collaboration and project reporting between operation users and service providers. The service provider payment module 2434 comprises software that provides payments, usually business-to-business type payments and payment monitoring to service providers. The optional onboarding module 2436 that renders a digital dashboard that enters new service provides and facilitates communication with operation users and service providers, and assign/complete key tasks like U.S. Citizenship and Immigration Services Employment Verification (1-9 verification), compliance checks, etc. The optional training module 2438 provides one or more sections of an electronic-learning course that focuses on a specific topic.

The Castle service provider domain 2440 serves a service provider job management module 2442, a service provider job details module 2444, a photo and/or document storage module 2446, a service provider payment history module 2448, an optional invoice and draws module 2450, an optional contractor accounting suite 2452, and the optional chat module 2408. A service provider job management module 2442 may comprise project management software that provides a single and secure platform that enables service providers to manage the complex project, phases, schedules, budgets, and/or risks that are associated with and/or are unique to service projects. The service provider job details module 2444 provides and/or tracks elaborated details of the project. The photo and document storage module 2446 provides software and memory that store documents and/or image files. In some resource management systems, it archives invoices and other documents. The service provider payment history module 2448 generates reports that show all payments made by the resource management system to the service provider. The optional invoice and draws module 2450 generate reports that show invoices issued to customers and/or homeowners and draws taken by service providers. The optional contractor accounting suite 2452 creates and shares estimates, invoices, collected payments. It further provides user-friendly software that tracks the service providers business income and expenses, and organizes the service providers' financial information eliminating the need for manual data entry.

An "engine" comprises a processor or a portion of a program executed by the processor that automatically executes or supports the procuring, furnishing, and delivering of resources through a self-service portal. It describes a special-purpose program that use models and/or deep learning algorithms to query big data and deliver resources. Big data describes large volumes of data—both structured and unstructured—that inundates a conventional resource management systems on a day-to-day basis. When functions, steps, etc., are said to be "responsive to" or occur "in response to" another function or step, etc., the functions or steps necessarily occur as a result of another function or step, etc. It is not sufficient that a function or act merely follow or occur subsequent to another.

Further, the various elements and system modules, components, and process steps described in each of the many systems and processes described herein and shown in FIGS. 1-33 is regarded as divisible with regard to the individual modules and elements described, rather than inseparable as a whole. In other words, alternate systems and processes encompass any variation and combinations of modules, elements, components, and process steps described herein and may be made, used, or executed without the various modules, functions, and/or elements described (e.g., they may operate in the absence of) including some, a few, and all of those disclosed in the prior art but not expressed in the disclosure herein. Thus, some systems do not include those disclosed in the prior art including those not described herein and thus are described as not being part of those systems and/or components and thus rendering alternative systems that may be claimed as systems and/or methods excluding those elements and/or steps.

Resource management systems provide rich visualizations of projects. Some systems streamline processes across selections, procurement, service, and finance, using intelligent caching and proxies that simplify managing remote resources and large data. The systems generate graphically rich interactive screens that dynamically render project information over time while guaranteeing cost commitments through invisible mappings. The mappings establish associations between resource addresses for remote sources and remote destinations to local sources through intelligent caches and proxies. The invisible mappings in some systems re-direct what is usually served by remote sources via external requests to local sources. The systems create the impression that content is served independently through containers and computer framing, without the delay and bandwidth consumption that usually comes with such technology.

The systems provide alerts and status indicators while providing observations that end-users make electronically. In operation, some end-users have access to projects in their domain through desktop software and mobile apps by the system's knowledge of its users. When access is granted, end-users coordinate services, enter observations, request assessments, establish analytics, track outcomes, quality, and receive guaranteed satisfaction.

The disclosed resource management systems employ a modular architecture that separates functions and makes the software code and/or the hardware implementations more adaptable. The disclosed system is easier to service and it is easier to update. The resource management systems subdivide functions into separate modules allowing them to be utilized with other functions and other components. The design ensures consistency, efficiency, and flexibility in serving one or more mobile applications.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A resource management system that manages remote and local data comprising:
   a declarative client for retrieving data, tracking data loading, and caching data in response to a transmission of an auto-generated query from an end-user interface;
   the declarative client sitting on an immutable image served by web services of a secure cloud platform;
   a serverless compute engine that receives the immutable image as a template in which a secure container is generated and triggers a plurality of tasks that process the immutable image within the secure container;
   an application programming interface that comprises software executed by the declarative client to extract data in response to the auto-generated query from the end-user interface; and
   wherein the declarative client includes a cache that breaks up results of the auto-generated queries into individual objects that are each associated with a unique identifier across one or more directories and a unique name within the cache to speed up an execution of the auto-generated queries; and
   wherein the extract data comprises data extracted from deconstructed downloaded content; and
   wherein the declarative client serves a plurality of portals that forwards a request to a scalable domain name system router for access to an instance of a cloud application associated with the resource management system; and
   wherein the scalable domain name system router caches a name and/or an IP address in response to the request for access to the instance of the cloud application so that a subsequent request can be served directly from the cache memory.

2. The system of claim 1 where the scalable domain name system router automatically transmits an automated request to a resource of the instance of the cloud application before the declarative client requests access to the instance of the cloud application.

3. The system of claim 2 where the domain name system routes traffic away from a requested instance of the cloud application in response to a notification received in response to the automated request.

4. The system of claim 1, further comprising a distribution module that transmits the request for access to the instance of the cloud application to one of a plurality of cache proxies at an edge location that provides a lowest response latency of the plurality of cache proxies and is in geographic proximity to the end-user interface; the one cache proxy stores content responsive to the request to achieve a faster response.

5. The system of claim 1 further comprising a storage device in communication with the instance of the cloud application that stores data asynchronously in one of a plurality of storage tiers based on an access pattern.

6. The system of claim 1 where the instance of the cloud application comprises a processor in communication with a memory through a network.

7. The system of claim 1 further comprising a serverless orchestration module that routes a publication when invoked by a compute service.

8. The system of claim 1 further comprising a metric repository that isolates resources when retrievable metrics generated by the instance of a cloud application indicate a volatile operating condition is detected.

9. The system of claim 1 where the auto-generated query is generated by query builder based on a plurality of application models and the auto-generated query comprise a GraphQL service.

10. The system of claim 1 further comprising a software layer that optimizes a voice messaging service, a video messaging service, or a textual messaging servicing.

11. The system of claim 1 further comprising a payment platform in communication with the declarative client and the application programming interface that communicates directly with the interface and the application programming interface and pushes a token to the interface and the application programming interface from which payment is drawn against.

12. The system of claim 1 further comprising authentication and authorization servers that generate a plurality of permissions that configure accessibility rights to the remote and local data.

13. The system of claim 12 where the authentication and authorization servers render a two-way authentication that comprises global positioning data processed by an end-user's device.

14. The system of claim 1 where the extract data comprises data representing a referral of a service professional.

15. The system of claim 1 where an acceptance of a referral of a service professional is based on the extract data and occurs electronically through an end-user's mobile device.

16. The system of claim 1 where acceptance of a quote from a service professional is based on the extract data and a shared cryptographic secret.

17. A non-transitory computer-readable storage medium having stored thereon a plurality of software instructions for managing remote and local data associated with a resource management system that, when executed by a hardware processor, causes:
   retrieving data and caching data in response to a transmission of an auto-generated query from an end-user interface through a declarative client;
   receiving an immutable image as a template in which a secure container is generated and a plurality of tasks that process the immutable image within the secure container by a serverless compute engine; and extracting data in response to the auto-generated query from the end-user interface through an application programming interface that comprises software executed by the declarative client; and serving a plurality of portals that forwards a request from the declarative client to a domain name system router that automatically transmits the request for access to an instance of a cloud application associated with the resource management system;

wherein the declarative client includes a cache that breaks up results of the auto-generated queries into individual objects that are each associated with a unique identifier across one or more directories and a unique name within the cache to speed up the execution of the auto-generated queries;

wherein the extract data comprises data extracted from deconstructed downloaded content; and wherein the domain name system router caches an Internet Protocol address in response to the request for access to the instance of the cloud application so that a subsequent request can be served directly from the cache memory.

18. The non-transitory computer-readable medium of claim 17 where a query builder generates the auto-generated query.

19. The non-transitory computer-readable medium of claim 18 where the query builder is based on a plurality of application models and a plurality of auto-generated queries comprise a GraphQL service.

20. The non-transitory computer-readable medium of claim 17 further comprising an optimizing a voice messaging service that is directly linked to the end-user.

21. The non-transitory computer-readable medium of claim 17 further comprising optimizing textual messaging service that is directly linked to an end-user.

22. The non-transitory computer-readable medium of claim 17 further comprising optimizing a video messaging service that is directly linked to an end-user.

23. The non-transitory computer-readable medium of claim 17 further comprising pushing a nonreducible token to the end user interface and the application programming interface for a payment transaction.

24. The non-transitory computer-readable medium of claim 17 further comprising generating user pools that configure accessibility rights to a remote data and a local data via an authentication and authorization server.

25. The non-transitory computer-readable medium of claim 24 where the authentication and authorization server render a two-way authentication comprising global positioning data rendered by an end-user's device.

26. The non-transitory computer-readable medium of claim 17 where the extract data comprises data representing a referral of a service professional.

27. The non-transitory computer-readable medium of claim 17 where an acceptance of a referral of a service professional occurs through an end-user's mobile device.

28. The non-transitory computer-readable medium of claim 17 where an acceptance of a quote from a service professional is based on a shared cryptographic secret stored on the non-transitory computer-readable medium and on an end-user's device.

29. The non-transitory computer-readable medium of claim 17 where the domain name system router automatically transmits an automated request to a resource of the instance of the cloud application before declarative client requests access to the instance of the cloud application.

30. The non-transitory computer-readable medium of claim 17 further comprising transmitting the request for access to the instance of the cloud application to one of a plurality of cache proxies at an edge location that provides a lowest response latency of the plurality of cache proxies and is in geographic proximity to the end-user interface.

* * * * *